(12) United States Patent
Kawahara

(10) Patent No.: US 12,457,404 B2
(45) Date of Patent: Oct. 28, 2025

(54) IMAGING APPARATUS, INFORMATION PROCESSING APPARATUS, INFORMATION PROCESSING METHOD, AND PROGRAM

(71) Applicant: Sony Group Corporation, Tokyo (JP)

(72) Inventor: Takumi Kawahara, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 45 days.

(21) Appl. No.: 18/018,990

(22) PCT Filed: Jul. 26, 2021

(86) PCT No.: PCT/JP2021/027475
§ 371 (c)(1),
(2) Date: Jan. 31, 2023

(87) PCT Pub. No.: WO2022/030275
PCT Pub. Date: Feb. 10, 2022

(65) Prior Publication Data
US 2023/0345107 A1    Oct. 26, 2023

(30) Foreign Application Priority Data

Aug. 7, 2020 (JP) ................................. 2020-134830

(51) Int. Cl.
*H04N 23/61* (2023.01)
*H04N 9/87* (2006.01)
*H04N 23/62* (2023.01)

(52) U.S. Cl.
CPC ............... *H04N 23/61* (2023.01); *H04N 9/87* (2013.01); *H04N 23/62* (2023.01)

(58) Field of Classification Search
CPC ........ H04N 23/73; H04N 23/631; H04N 9/87; H04N 23/61; H04N 23/80; H04N 23/611;
(Continued)

(56) References Cited

U.S. PATENT DOCUMENTS

| 2007/0217765 A1 | 9/2007 | Itoh |
| 2010/0296798 A1* | 11/2010 | Koyama ................ H04N 5/77 386/343 |

FOREIGN PATENT DOCUMENTS

| CN | 101924898 A | 12/2010 |
| CN | 102611845 A | 7/2012 |

(Continued)

*Primary Examiner* — Thai Q Tran
*Assistant Examiner* — Nienru Yang
(74) *Attorney, Agent, or Firm* — Paratus Law Group, PLLC

(57) ABSTRACT

There is provided an imaging apparatus, an information processing apparatus, an information processing method, and a program capable of more easily controlling a frame rate of an image. In order to accomplish the above-mentioned objective, an imaging apparatus according to an embodiment of the present technology includes a recognition unit and a determination unit. The recognition unit recognizes a particular subject in an image. The determination unit determines whether or not a distance between the recognized particular subject and a frame rate region for setting a frame rate of the image is equal to or smaller than a threshold. Accordingly, the frame rate of the image in shooting, reproduction, and editing of the image can be easily controlled by more intuitive input than in the prior art.

18 Claims, 15 Drawing Sheets

(58) Field of Classification Search
CPC .......... H04N 23/62; H04N 5/783; G06T 7/80;
G06V 10/10; G06V 40/10
USPC ....................................................... 386/224
See application file for complete search history.

(56) References Cited

FOREIGN PATENT DOCUMENTS

| | | | | |
|---|---|---|---|---|
| CN | 105635624 A | | 6/2016 | |
| CN | 110135246 B | * | 10/2023 | ......... G06K 9/00288 |
| JP | 2011-010276 A | | 1/2011 | |

* cited by examiner

A

B

IMAGING APPARATUS, INFORMATION PROCESSING APPARATUS, INFORMATION PROCESSING METHOD, AND PROGRAM

CROSS REFERENCE TO PRIOR APPLICATION

This application is a National Stage Patent Application of PCT International Patent Application No. PCT/JP2021/027475 (filed on Jul. 26, 2021) under 35 U.S.C. § 371, which claims priority to Japanese Patent Application No. 2020-134830 (filed on Aug. 7, 2020), which are all hereby incorporated by reference in their entirety.

TECHNICAL FIELD

The present technology relates to an imaging apparatus, an information processing apparatus, an information processing method, and a program that can be applied to moving image editing and the like.

BACKGROUND ART

In an image reproducing apparatus described in Patent Literature 1, a reproduction speed of a moving image is controlled in accordance with a distance between a plurality of particular objects in the moving image or a distance between a fixed position and an object of interest. Accordingly, it is achieved so as to contribute to optimization of the reproduction speed for an important scene (paragraphs and , FIG. 3, and the like of Patent Literature 1).

CITATION LIST

Patent Literature

Patent Literature 1: Japanese Patent Application Laid-open No. 2011-10276

DISCLOSURE OF INVENTION

Technical Problem

A method of changing a frame rate of a moving image is sometimes used in order to make a particular scene of the moving image impressive as in Patent Literature 1. As such, it is desirable to provide a technology that enables a frame rate of an image to be easily controlled.

In view of the above-mentioned circumstances, it is an objective of the present technology to provide an imaging apparatus, an information processing apparatus, an information processing method, and a program capable of more easily controlling a frame rate of an image.

Solution to Problem

In order to accomplish the above-mentioned objective, an imaging apparatus according to an embodiment of the present technology includes a recognition unit and a determination unit.

The recognition unit recognizes a particular subject in an image.

The determination unit determines whether or not a distance between the recognized particular subject and a frame rate region for setting a frame rate of the image is equal to or smaller than a threshold.

In this imaging apparatus, the particular subject in the image is recognized. The distance between the recognized particular subject and the frame rate region for setting the frame rate of the image is equal to or smaller than the threshold whether or not is determined. Accordingly, the frame rate of the image can be easily controlled.

The imaging apparatus may further include a frame rate region setting unit that sets the frame rate region.

The imaging apparatus may further include a frame rate setting unit that sets the frame rate of the image.

The imaging apparatus may further include a shooting control unit that makes control to shoot the image at the set frame rate in a case where the determination unit determines that the distance between the particular subject and the set frame rate region is equal to or smaller than the threshold.

The imaging apparatus may further include a reproduction control unit that makes control to reproduce the image at the set frame rate in a case where the determination unit determines that the distance between the particular subject and the set frame rate region is equal to or smaller than the threshold.

The frame rate region setting unit may set the frame rate region as a point.

The frame rate region setting unit may set the frame rate region as a line.

The frame rate region setting unit may set the frame rate region as a region with a predetermined area.

The frame rate region setting unit may set a plurality of frame rate regions each of which is the frame rate region. In this case, the shooting control unit may make control to shoot the image at the set frame rate in a case where the determination unit determines that the distance between the particular subject and each of the plurality of set frame rate regions is equal to or smaller than the threshold.

The frame rate region setting unit may set a plurality of frame rate regions. In this case, the reproduction control unit may make control to reproduce the image at the set frame rate in a case where the determination unit determines that the distance between the particular subject and each of the plurality of set frame rate regions is equal to or smaller than the threshold.

The frame rate region setting unit may set the frame rate region as a region with a predetermined area. In this case, the shooting control unit may make control to shoot the image at the set frame rate in a case where the determination unit determines that the particular subject is located within an area of the set frame rate region.

The frame rate region setting unit may set the frame rate region as a region with a predetermined area. In this case, the reproduction control unit may make control to reproduce the image at the set frame rate in a case where the determination unit determines that the particular subject is located within an area of the set frame rate region.

The imaging apparatus may further include an operation unit that receives an operation of a user. In this case, the frame rate region setting unit may set the frame rate region in accordance with the operation of the user on the operation unit.

The imaging apparatus may further include an operation unit that receives an operation of a user. In this case, the frame rate setting unit sets the frame rate of the image in accordance with the operation of the user on the operation unit.

The frame rate setting unit may set the frame rate so that the frame rate changes stepwisely in accordance with a distance between the particular subject and the frame rate region.

The frame rate setting unit may set the frame rate so that the frame rate changes continuously in accordance with the distance between the particular subject and the frame rate region.

An information processing apparatus according to an embodiment of the present technology includes a recognition unit and a determination unit.

The recognition unit recognizes a particular subject in an image.

The determination unit determines whether or not a distance between the recognized particular subject and a frame rate region for setting a frame rate of the image is equal to or smaller than a threshold.

An information processing method according to an embodiment of the present technology is an information processing method executed by a computer system and includes recognizing a particular subject in an image.

Whether or not a distance between the recognized particular subject and a frame rate region for setting a frame rate of the image is equal to or smaller than a threshold is determined.

A program according to an embodiment of the present technology causes a computer system to execute the following steps.

A step of recognizing a particular subject in an image.

A step of determining whether or not a distance between the recognized particular subject and a frame rate region for setting a frame rate of the image is equal to or smaller than a threshold.

MODE(S) FOR CARRYING OUT THE INVENTION

Hereinafter, embodiments according to the present technology will be described with reference to the drawings.

[Imaging Apparatus]

Figure 1:
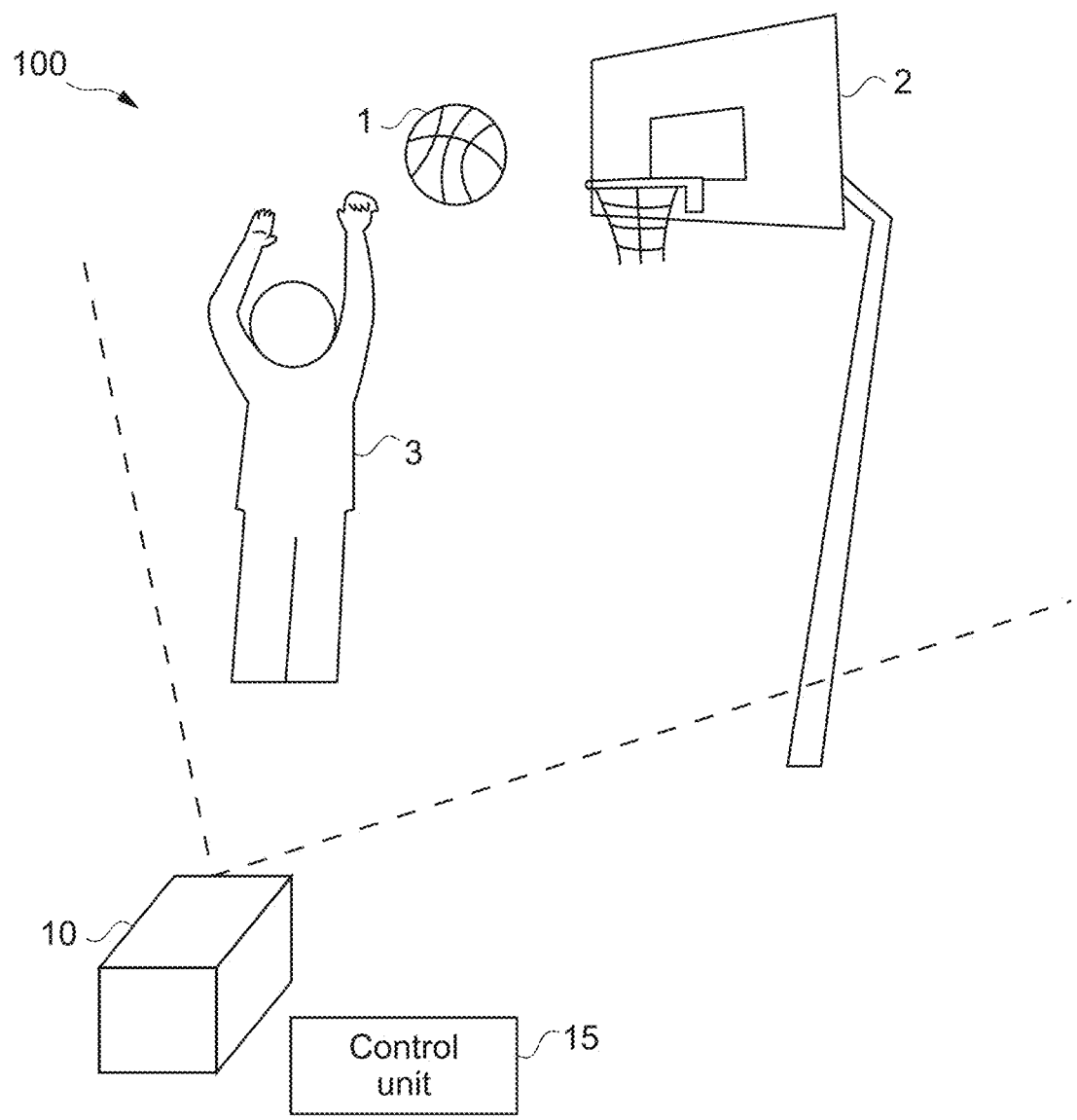
FIG. 1 A schematic diagram for describing an overview of an imaging apparatus.

FIG. 1 is a schematic diagram for describing an overview of an imaging apparatus according to the present technology.

An imaging apparatus 10 includes an imaging element 13 (image sensor), an optical system 11, a diaphragm, and the like (not shown) and is capable of shooting an angle of view. In the present embodiment, the imaging apparatus 10 shoots an image of a person 3 who threw a basketball 1 to a goal 2.

It should be noted that configurations that the imaging apparatus has are not limited. For example, an image sensor such as a complementary metal-oxide semiconductor (CMOS) sensor and a charge coupled device (CCD) may be used as the imaging element 13.

Moreover, the imaging apparatus 10 recognizes a particular subject in an image and determines whether or not the distance between the particular subject and a frame rate region for setting a frame rate of the image is equal to or smaller than a threshold.

For example, in a case where a distance between the basketball 1 as the particular subject and a frame rate region including the goal 2 becomes equal to or smaller than a threshold, the frame rate of the image is controlled. That is, in accordance with the distance between the particular subject and the frame rate region, the frame rate of the image is controlled.

The frame rate region is a region that includes a point, a line, and a region with a predetermined area and is set at a particular position in the image in advance.

The particular subject is a subject of subjects included in the image, which is recognized by a recognition unit 17 to be described later.

It should be noted that the image includes a shooting image and a reproduction image.

Moreover, the imaging apparatus 10 sets a frame rate of an image region. For example, in accordance with the user's input, a region with a certain area may be specified as the frame rate region or the frame rate region may be specified as a line or a point. Taking FIG. 1 as an example, a path (trajectory) of the basketball 1 to enter the goal 2 may be set as the frame rate region. Moreover, for example, a rectangular region centered at the goal 2 may be set as the frame rate region. It should be noted that the shape and area of the frame rate region are not limited.

Moreover, the imaging apparatus 10 controls the frame rate of the image. In the present embodiment, the imaging apparatus 10 controls the frame rate of the image during shooting and during reproduction.

For example, the imaging apparatus 10 makes control to shoot or reproduce the image at the set frame rate in a case where it is determined that the distance from the particular subject and the set frame rate region is equal to or smaller than the threshold.

Figure 2:
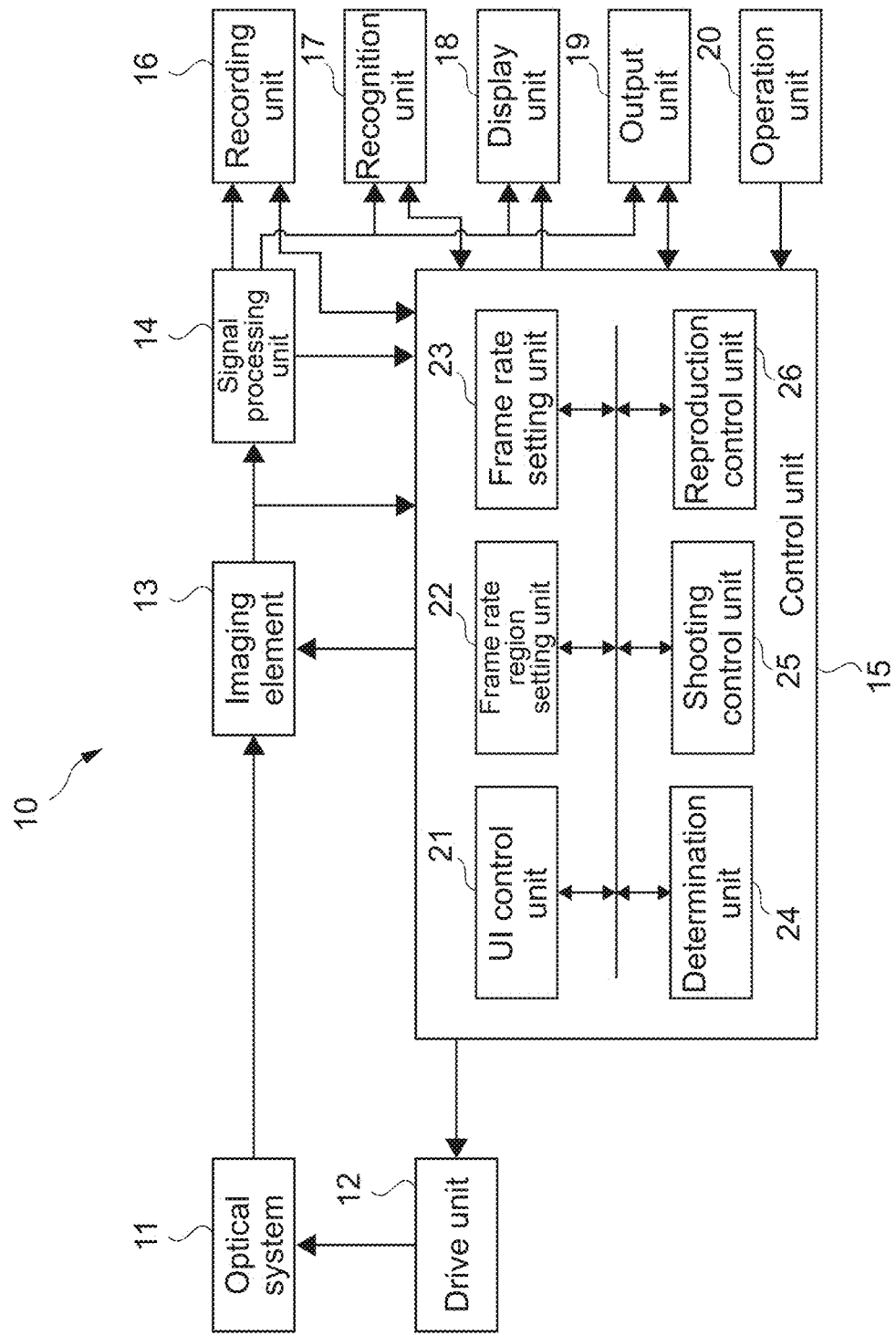
FIG. 2 A block diagram showing a functional configuration example of the imaging apparatus.

FIG. 2 is a block diagram showing a functional configuration example of the imaging apparatus 10.

As shown in FIG. 2, the imaging apparatus 10 has the optical system 11, a drive unit 12, the imaging element 13, a signal processing unit 14, a control unit 15, a recording unit 16, the recognition unit 17, a display unit 18, an output unit 19, and an operation unit 20.

The optical system 11 includes a lens, a diaphragm mechanism, a shutter, and the like. For example, various lenses such as an incident end lens, a zoom lens, a focus lens, and a condenser lens may be used for the optical system 11. It is also possible to use, for example, a shutter unit such as a diaphragm mechanism and a focal-plane shutter that controls light exposure by adjusting the aperture or the like with a lens or an iris (diaphragm) so as to perform sensing within a dynamic range so that signal electric charges are not saturated.

The drive unit 12 drives the lenses and the like included in the optical system 11.

The imaging element 13 controls exposure to incident light from the subject via the optical system 11. Moreover, the imaging element 13 includes a processor that performs CDS processing, AGS processing, and A/D conversion processing for example on electrical signals photoelectrically converted on a pixel-by-pixel basis.

In the present embodiment, shooting image signals as digital data are output to the signal processing unit 14 and the control unit 15.

The signal processing unit 14 includes, for example, a microprocessor specialized for digital signal processing, such as a digital signal processor (DSP), a microcomputer, and the like. The signal processing unit 14 performs various types of signal processing on digital signals (captured image signals) transmitted from the imaging element 13. Specifically, the signal processing unit 14 performs processing such as correction processing, white balance correction, aberration correction, and shading correction among R, G, B color channels. Moreover, the signal processing unit 14 performs respective types of processing such as YC generation processing of generating (dividing) a luminance (Y) signal and a chrominance (C) signal from the R, G, and B image data, processing of adjusting the luminance and color, knee correction, and gamma correction. The signal processing unit 14 outputs image signals subjected to the various types of signal processing to the recognition unit and the control unit. In addition, the signal processing unit 14 performs resolution conversion processing, codec processing of encoding for recording and communication, and the like, thereby performing conversion into a final output format. Image signals converted into the final output format are recorded in the recording unit 17. Moreover, the image signals are displayed on the display unit 18 as an image. In addition, the image signals are output from an external output terminal so that they are displayed on an apparatus such as a monitor provided outside the imaging apparatus 1. Shooting image signals in this example refer to image signals output from the signal processing unit 14. Displaying the shooting image signals on the display unit 18 as a shooting image enables the user to check the image during shooting in real time. Moreover, reproduction image signals in this example refer to image signals output from the recording unit 16. Displaying the reproduction image signals on the display unit 18 as a reproduction image enables the user to check the recorded image.

The control unit 15 includes a microcomputer (arithmetic processing apparatus) having a central processing unit (CPU) and comprehensively controls the imaging apparatus 10. For example, the control unit 15 makes instructions about various types of signal processing in the signal processing unit 14 according to the user's operations, an imaging operation, and a recording operation, and a reproduction operation of a recorded image file. The control unit 15 performs switching of various shooting modes and the like. The various shooting modes are, for example, a still-image shooting mode, a movie shooting mode, a continuous shooting mode for acquiring still images continuously, and the like. The control unit 15 includes a user interface control unit 21 (UI control unit 21) for enabling the user to make operations for these functions.

The UI control unit 21 performs processing of detecting an operation on each operation element provided in the imaging apparatus 10, display processing on the display unit 18, operation detection processing, and the like. Moreover, the control unit 15 controls various lenses that the optical system 11 has. For example, the UI control unit 21 performs processing of specifying an F-value for ensuring an amount of light required for AF control, makes an operation instruction for the diaphragm mechanism according to the F-value, for example.

The ROM, the flash memory, and the like store programs and the like that the control unit 15 uses. The ROM, the flash memory, and the like store application programs, firmware, and the like for various operations as well as an operating system (OS) for the CPU to control each unit and content files such as image files. The control unit 15 executes the programs, thereby controlling the entire imaging apparatus 10. The RAM temporarily stores data, programs, and the like used in various types of data processing that the CPU of the control unit 15 executes so that it is used as a work area for the control unit 15.

Moreover, the control unit 15 has the UI control unit 21, a frame rate region setting unit 22, a frame rate setting unit 23, a determination unit 24, a shooting control unit 25, and a reproduction control unit 26.

The frame rate region setting unit 22 sets a frame rate region. For example, the frame rate region setting unit 22 sets the frame rate region in the image in accordance with an operation of the user.

The frame rate setting unit 23 sets a frame rate of the image. For example, the user sets the frame rate of the image when the particular subject and the set frame rate region come close to each other.

The determination unit 24 determines whether or not the distance between the particular subject and the frame rate region is equal to or smaller than the threshold. It should be noted that the threshold determined by the determination unit 24 may be preset or may be set by the user.

In a case where the determination unit 24 determines that the distance between the particular subject and the frame rate region set by the frame rate region setting unit 22 is equal to or smaller than the threshold, the shooting control unit 25 makes control to shoot an image at a frame rate set by the frame rate setting unit 23. For example, in a case where the distance between the particular subject and the frame rate region is equal to or smaller than the threshold, the imaging element 13 is controlled to shoot the image at the set frame rate.

In a case where the determination unit 24 determines that the distance between the particular subject and the frame rate region set by the frame rate region setting unit 22 is equal to or smaller than the threshold, the reproduction control unit 26 makes control to reproduce the image at the frame rate set by the frame rate setting unit 23.

For example, in a case of controlling the frame rate during reproduction of the image, image signals from the recording unit 16 are supplied to the reproduction control unit 26, the control unit 15 performs decimation or addition processing of the frame rate on the image signals, and the reproduction control unit 26 controls the display unit 18 to display the image signals at the set frame rate of the image on the display unit 18 or to reproduce the image signals at the set frame rate of the image.

Also, for controlling the frame rate during reproduction, decimation or addition processing may be performed on an image shot in advance at high frames per second or at low frames per second as during shooting.

Moreover, the shooting control unit 25 and the reproduction control unit 26 are capable of performing processing related to the frame rate of the image. For example, the shooting control unit 25 and the reproduction control unit 26 perform decimation or addition processing of the frame rate. For example, in a case where the shooting control unit 25 controls the frame rate during shooting of the image, image signals from the signal processing unit 14 are supplied to the shooting control unit 25 and the shooting control unit 25 controls the frame rate of the image.

A control method for the frame rate is not limited, and for example, the shooting control unit 25 may control the imaging element 13 to perform shooting at the set frames per second. Moreover, for example, the imaging element 13 may shoot all images at high frames per second or at low frames per second and decimation or addition processing may be performed on the shot images. The processing related to the frame rate will be described later.

Moreover, the shooting control unit 25 and the reproduction control unit 26 set the frame rate so that the frame rate changes stepwisely or continuously in accordance with the distance between the particular subject and the frame rate region.

For example, the shooting control unit 25 and the reproduction control unit 26 may set the frame rate on the basis of a table storing frames per second according to distances between the particular subject and the frame rate region. As a matter of course, the present technology is not limited thereto, and the frame rate may be set by various methods.

The recording unit 16 includes, for example, a nonvolatile memory, and stores image files (content files) such as still-image data and moving-image data, attribute information of the image files, thumbnail images, and the like. The image files are stored in a format such as joint photographic experts group (JPEG), tagged image file format (TIFF), and graphics interchange format (GIF), for example. A wide variety of actual forms are possible for the recording unit 16. For example, the recording unit 16 may be configured as a flash memory built in the imaging apparatus or may include a memory card (e.g., portable flash memory) removably mounted on the imaging apparatus and an access unit that performs access for storing in the memory card or reading from the memory card. Moreover, the recording unit 16 may be realized as a hard disk drive (HDD) or the like built-in the imaging apparatus.

The recognition unit 17 recognizes a particular subject in the image from the shooting image signals or the reproduction image signals. The recognition unit 17 may recognize a subject specified as the particular subject by an operation of the user or the like or may automatically recognize not only an operation of the user but also a particular subject such as a ball by machine learning. For example, the recognition unit 17 recognizes a person, human body parts of the person, such as arms, body, and legs, a ball, and the like in the image.

It should be noted that a recognition method is not limited. Analysis is performed by image recognition, threshold processing, segmentation, image signal analysis, and the like. The analysis method is not limited, and an arbitrary method may be used. The image analysis may be performed by machine learning, for example.

For example, any machine learning algorithm using a deep neural network (DNN) or the like may be used. For example, artificial intelligence (AI) or the like that performs deep learning may be used.

For example, a learning unit and an identification unit are built for image recognition. The learning unit performs machine learning on the basis of input information (learning data) and outputs a learning result. Moreover, the identification unit performs identification (e.g., judgement, prediction) of the input information on the basis of the input information and the learning result.

For example, neural network and deep learning are used for learning techniques in the learning unit. The neural network is a model that mimics neural networks of a human brain. The neural network is constituted by three types of layers of an input layer, an intermediate layer (hidden layer), and an output layer.

The deep learning is a model using neural networks with a multi-layer structure. The deep learning can repeat characteristic learning in each layer and learn complicated patterns hidden in mass data.

The deep learning is, for example, used for the purpose of identifying objects in a moving image. For example, a convolutional neural network (CNN) or the like used for recognition of an image or moving image is used.

Moreover, a neuro chip/neuromorphic chip in which the concept of the neural network has been incorporated can be used as a hardware structure that realizes such machine learning.

Moreover, the recognition unit 17 detects a position and a frame rate of an object in an image. For example, the recognition unit 17 may detect a coordinate value (e.g., XYZ coordinate value) defined by an absolute coordinate system (world coordinate system) of the ball or a coordinate value defined by a relative coordinate system using a predetermined point as the basis (point of origin) (e.g., xyz coordinate value or uvd coordinate value). It should be noted that in a case where the relative coordinate system is used, the point of origin that is the basis may be arbitrarily set.

The display unit 18 performs processing for performing various types of display to the user. In the present embodiment, the image reproduced at the set frame rate is displayed on the display unit 18.

Moreover, the display unit 18 performs processing of displaying image data converted into a suitable resolution input from the signal processing unit 14. Accordingly, a live view image (also referred to as through-image) that is a captured image standing by until it is released is displayed. In addition, on the basis of an instruction from the control unit 15, the display unit 18 displays graphical user interfaces (GUIs) on the screen, such as various operation menus, icons, and messages. Moreover, the display unit 18 is capable of displaying the reproduction image read from the recording medium in the recording unit 16.

Moreover, in the present embodiment, GUIs capable of setting the frame rate region are displayed on the display unit 18.

The output unit 19 performs data communication and network communication with external information processing with a wire or wirelessly. Captured image data (still-image file or moving-image file) is sent to, for example, an external display apparatus, a recording apparatus, a reproduction apparatus, an editor apparatus, or the like. Moreover, the output unit 19 may function as a network communication unit. For example, communication using various networks such as the Internet, a home network, and a local area network (LAN) may be performed and various data may be sent and received to/from a server, a terminal, and the like in the network.

The operation unit 20 is for performing various operations and settings. For example, the operation unit 20 includes a reproduction menu start button, a determination button, a D-pad, a cancel button, a zoom key, a slide key, a shutter button, and the like and further includes a monitor using a touch panel system and the like. The operation unit 20 outputs to the control unit 15 operation information according to various operations such as tap operations and swipe operations by a cameraman.

In the present embodiment, a particular subject recognized by the recognition unit 17 may be selected by an operation of the user via the operation unit 20.

Moreover, in the present embodiment, the user can make an operation on the GUIs displayed on the display unit 18 via the operation unit 20 and set the frame rate region. For example, the position and the size of the frame rate region and the kinds of point, line, region, and the like are set.

Moreover, in the present embodiment, the user can set the frame rate of the image via the operation unit 20. For example, it is possible to input the numerical value of the frame rate or input an expected path on which the particular subject is expected to pass by tracing it at a desired speed, for example.

It should be noted that in the present embodiment, the recognition unit 17 corresponds to a recognition unit that recognizes a particular subject in an image.

It should be noted that in the present embodiment, the determination unit 24 corresponds to a determination unit that determines whether or not a distance between the recognized particular subject and a frame rate region for setting a frame rate of the image is equal to or smaller than a threshold.

It should be noted that in the present embodiment, the frame rate region setting unit 22 corresponds to a frame rate region setting unit that sets the frame rate region.

It should be noted that in the present embodiment, the frame rate setting unit 23 corresponds to a frame rate setting unit that sets the frame rate of the image.

It should be noted that in the present embodiment, in a case where the determination unit determines that the distance from the particular subject and the set frame rate region is equal to or smaller than the threshold, the shooting control unit 25 corresponds to a shooting control unit that makes control to shoot the image at the set frame rate.

It should be noted that in the present embodiment, in a case where the determination unit determines that the distance from the particular subject and the set frame rate region is equal to or smaller than the threshold, the reproduction control unit 26 functions as a reproduction control unit that makes control to reproduce the image at the set frame rate.

It should be noted that in the present embodiment, the operation unit 20 corresponds to an operation unit that receives an operation of a user.

Figure 3:
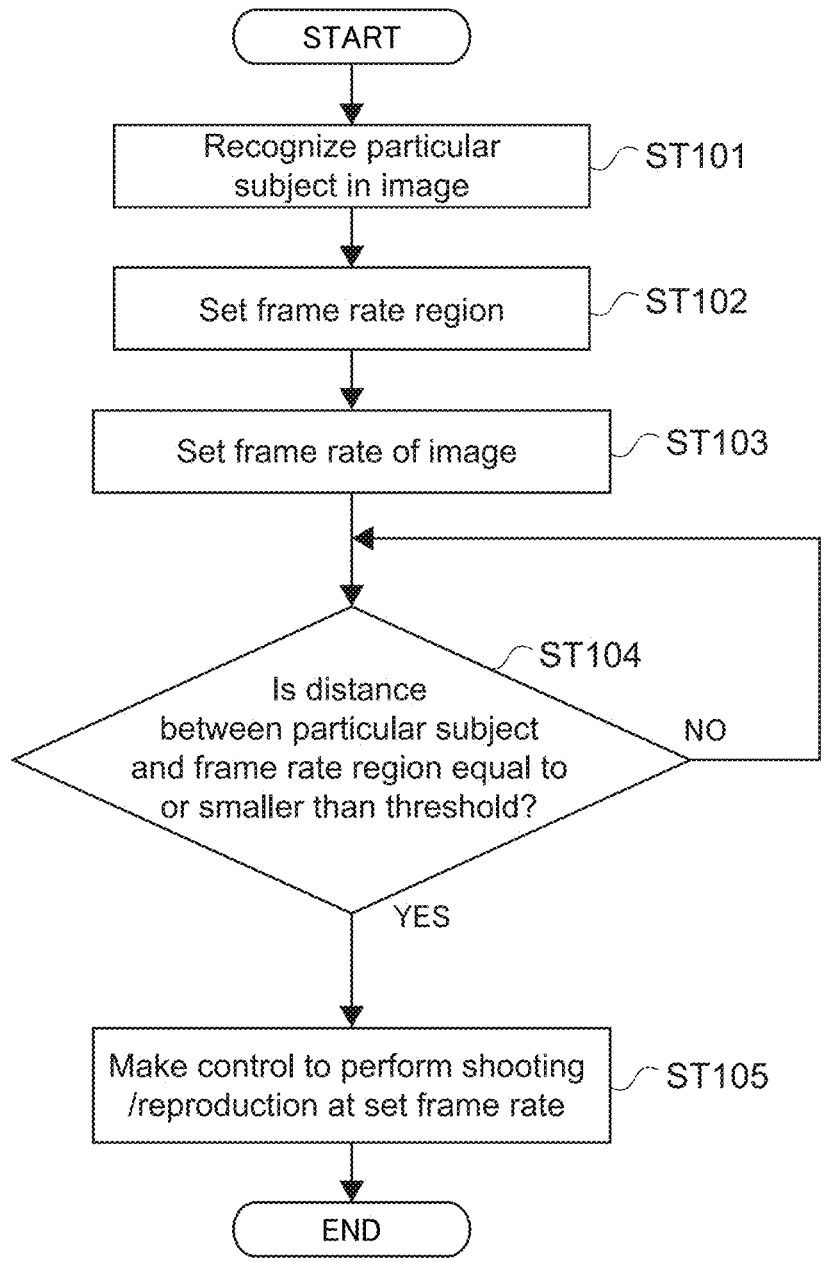
FIG. 3 A flowchart showing an example of control of the frame rate.

FIG. 3 is a flowchart showing an example of control of the frame rate.

The recognition unit 17 recognizes a particular subject in an image (Step 101).

Figure 4:
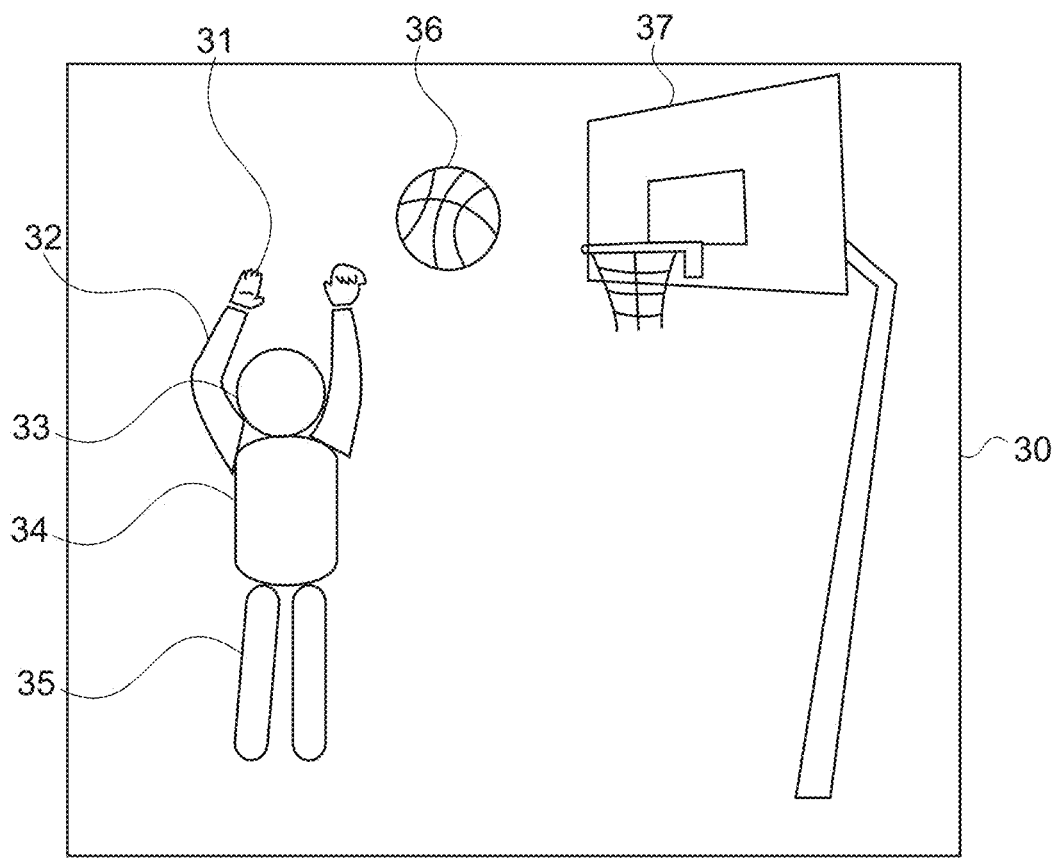
FIG. 4 A schematic diagram showing examples of a GUI that enables a particular subject to be selected.
Figure 4:
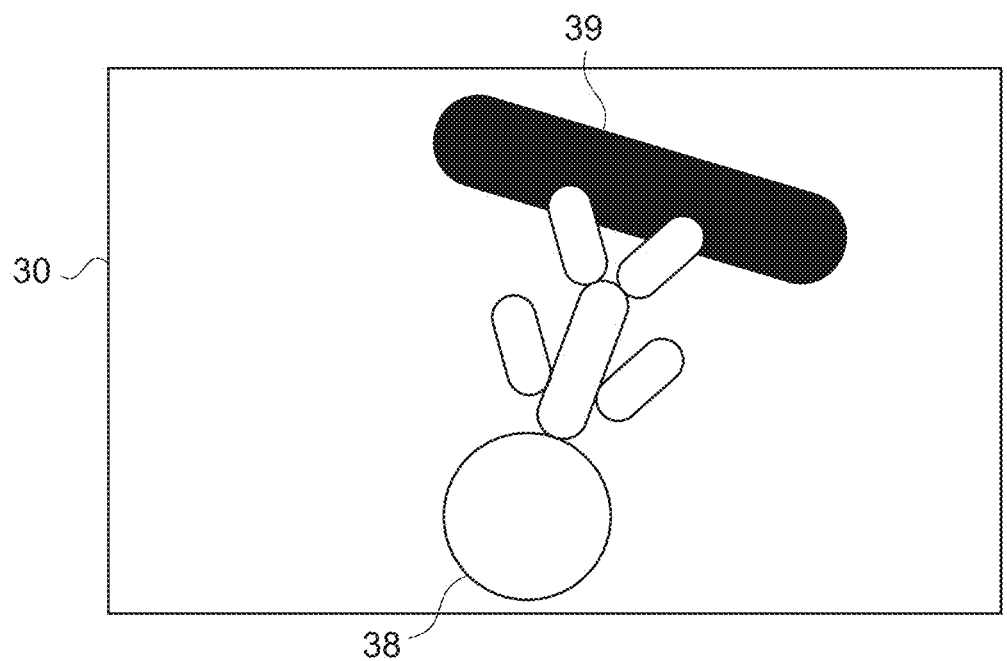

FIG. 4 is a schematic diagram showing examples of a GUI that enables a particular subject to be selected.

The user can select an arbitrary object in the image displayed in the GUI as the particular subject via the operation unit 20. In the present embodiment, the user selects the particular subject by touching an arbitrary object displayed in a GUI 30 shown in FIG. 4. In addition, a menu for presenting objects that can be selected as a particular subject, such as human body parts including hands, face, and legs, a ball, and a goal may be displayed.

In the present embodiment, in A of FIG. 4, the user can select as the particular subject, a human body site such as a hand 31, an arm 32, a head 33, a body 34, and a leg 35, a ball 36, or a goal 37 via the GUI 30. For example, the recognition unit 17 may recognize the human body sites such as the hand 31, the arm 32, the head 33, the body 34, and the leg 35 by semantic segmentation or the like. Moreover, a boundary of a region of each site may be displayed at that time.

Moreover, in a case where there is a plurality of objects recognized as the same kind of objects during object recognition, one object is recognized by recognizing a characteristic that the particular subject holds the object, the object is bigger, or the object is focused better, for example.

Moreover, for example, in a case where a rehearsal image has been acquired, it may be possible to select an object at a certain frame of the rehearsal image, which is wished to focus on, and set the selected object as the particular subject.

The rehearsal image is an image displayed on the display unit 18 when setting the frame rate region and the like. For example, an image similar to an image that the user wishes to control the frame rate is the rehearsal image. Specifically, in FIG. 4, a scene in which the basketball is shot to the goal is the rehearsal image.

It should be noted that a method of acquiring the rehearsal image is not limited, and for example, in a case of controlling the frame rate during reproduction, an image recorded in the recording unit 16 may be acquired as the rehearsal image. Moreover, for example, during shooting, the user may select a scene of sports or the like and a rehearsal image suitable to that scene (including one that is not an actually shot video, for example, a sample image of a goal scene) may be displayed. In this case, the user may make an operation while seeing the sample image or a shooting image that is an image that is being shot actually currently may be displayed as the rehearsal image.

Moreover, as in B of FIG. 4, in a case where the particular subject makes a big move, for example, the person 38 does a 360-degree flip on a board 39, the particular subject can be tracked by selecting not the position of the center of weight of the person 38 but the board 39 as the particular subject.

As a matter of course, the recognition unit 17 may recognize the particular subject automatically. In this case, a GUI 60 may display the recognized particular subject so that the user can identify it.

Referring back to FIG. 3, the frame rate region setting unit 22 sets a frame rate region (Step 102).

The frame rate setting unit 23 sets a frame rate of the image (Step 103).

Figure 5:
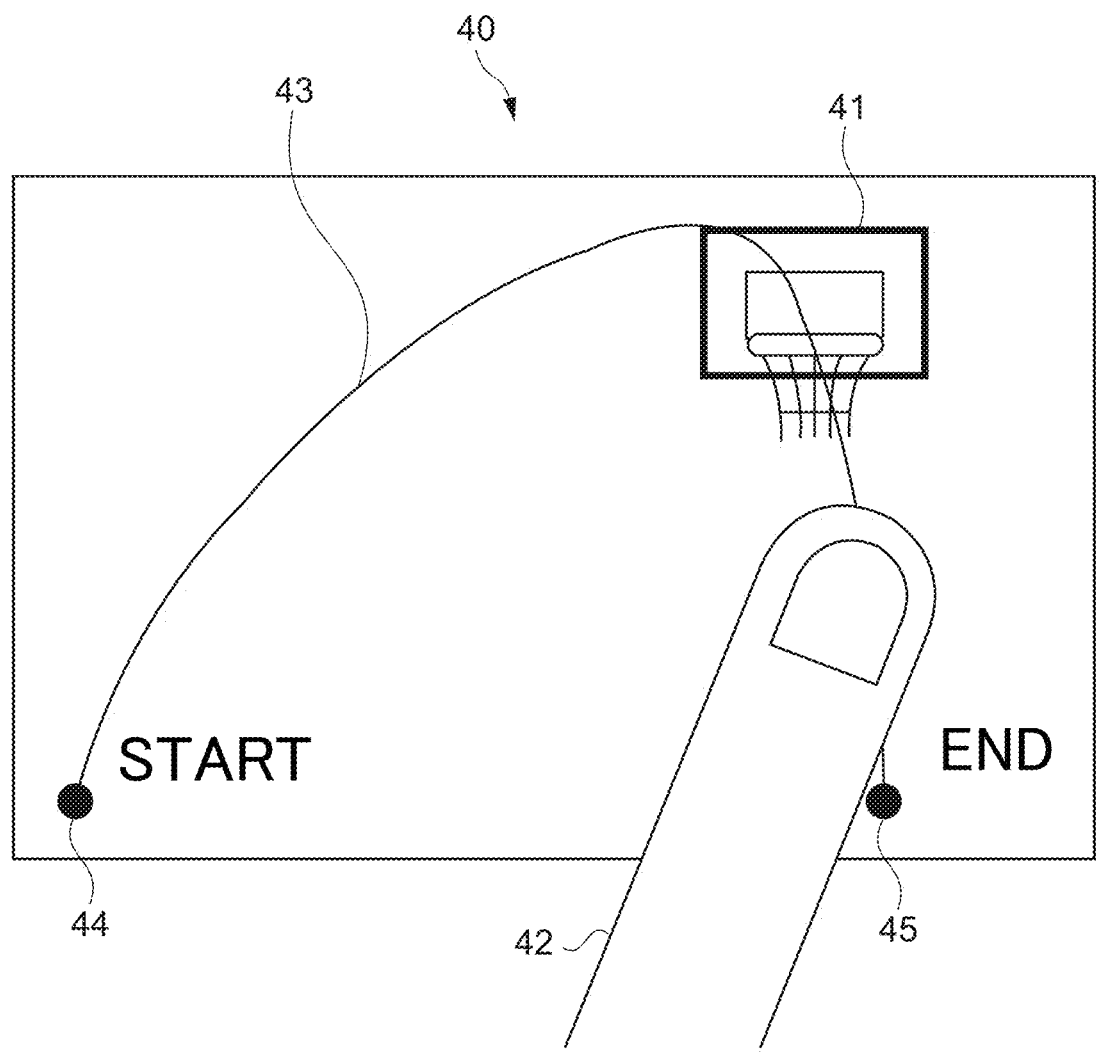
FIG. 5 A schematic diagram showing an example of settings of a frame rate region and a frame rate of an image.

FIG. 5 is a schematic diagram showing an example of settings of the frame rate region and the frame rate of the image. In FIG. 5, a control GUI 40 capable of controlling the frame rate is displayed on the display unit 18.

In the present embodiment, the user is capable of setting the frame rate region and the frame rate of the image by touching the display unit 18 on which the control GUI 40 has been displayed.

As shown in FIG. 5, shooting of a basketball match is performed by the imaging apparatus 10 and a goal 41 is displayed. Moreover, FIG. 5 shows a moment when the basketball is passing through the goal.

The user touches the display unit 18 with a finger 42 and sets a frame rate region. In the present embodiment, the user can set a frame rate region by tracing an expected path 43 along which the basketball is expected to pass (a line from a start point 44 to an end point 45) with the finger 42.

Moreover, the user can set the frame rate of the image during reproduction by controlling the speed of the finger 42 when tracing the expected path 43. That is, the frame rate of the image is controlled on the basis of the speed of inputting the finger 42.

For example, on the basis of the tracing speed of the finger 42 of the user (the speed input by the user) and the speed of the particular subject during actual shooting or during reproduction, the frame rate set during shooting or during reproduction is calculated. A specific calculation method is described below.

Here, a method of calculating a controlled frame rate of the image on the basis of the speed of the particular subject input by the user's finger will be described.

For determining a controlled frame rate F of the image, the following parameters are used.

An actual speed of the particular subject is denoted by Vnow.

A speed of the particular subject input by the user is denoted by Vexpected.

A frame rate of the image set by the user is denoted by Fplay.

It should be noted that Vnow is acquired by the recognition unit 17. Vexpected is set by the frame rate setting unit 23. Moreover, Fplay denotes a frame rate preset by the user's input.

Moreover, Vexpected denotes a speed of the particular subject at each position of the expected path 43. That is, it can also be said that the expected path 43 is a set of points indicating respective positions of the particular subject. For example, the speed of the particular subject input by the user at the start point 44 can be denoted by Vexpected(1). Moreover, for example, a speed of the particular subject input by the user at the end point 45 can be denoted by Vexpected(n).

Moreover, an actual speed of the particular subject corresponding to Vexpected(1) can be denoted by Vnow(1). Similarly, an actual speed of the particular subject corresponding to Vexpected(n) can be denoted by Vnow(n).

Here, an expression for determining the controlled frame rate F of the image by the control unit 15 is described as Expression 1 below.

$$F=F\text{play} \times (V\text{now}/V\text{expected}) \quad \text{[Expression 1]}$$

The processing of (Expression 1) is performed for each frame with respect to the frame rate set for each position of the expected path and the frame rate is controlled. For example, for reducing the speed of the image at a predetermined position in the frame rate region to one-fifth, assuming that the frames per second during reproduction are 24, the frames per second of the image at the predetermined position is controlled to be 120.

Moreover, during shooting, such processing is performed for each frame and the frame rate is controlled.

Figure 6:
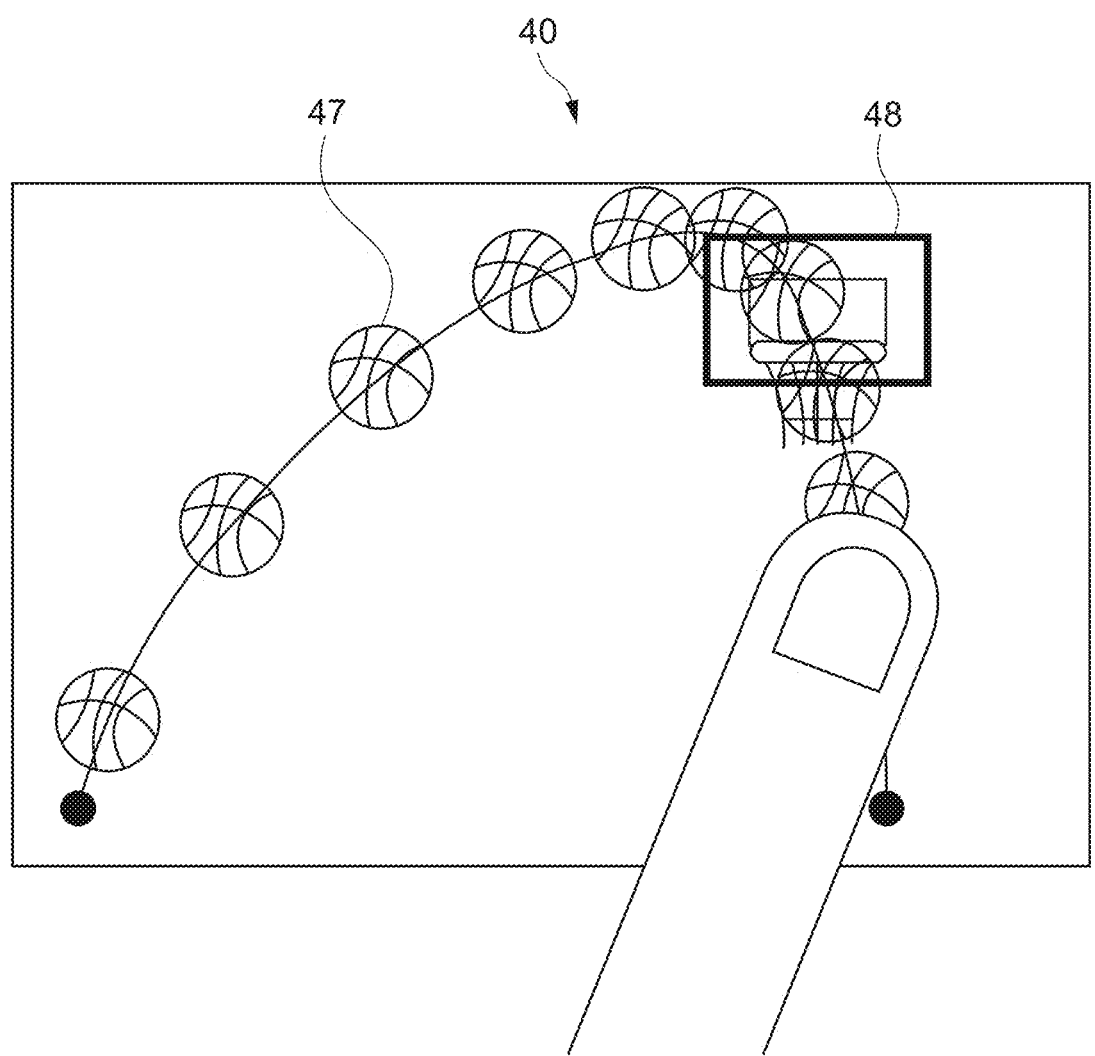
FIG. 6 A schematic diagram showing an example of settings of the frame rate region and the frame rate of the image in a case where a rehearsal image has been acquired.

FIG. 6 is a schematic diagram showing an example of settings of the frame rate region and the frame rate of the image in a case where the rehearsal image has been acquired.

In FIG. 6, the control GUI 40 in a case where the rehearsal image has been acquired is shown as an example.

In a case where the rehearsal image has been acquired, a basketball 47 is ghost-displayed on the basis of the expected path input by the user and the frame rate.

The ghost display refers to virtually displaying how the particular subject moves over a plurality of frames in accordance with the expected path that is the frame region and the set frame rate. For example, when ghosts are displayed overlapping each other, it indicates that the motion is slow, and when ghosts are displayed spaced apart from each other, it indicates that the motion is quick.

For example, since ghosts of the basketball 47 near a goal 48 are displayed overlapping each other in FIG. 5, the frame rate of the image is controlled to be lower when the basketball 47 is located near the goal 48.

Also as for a control method for the frame rate of the image in a case where the rehearsal image has been acquired in FIG. 6, processing similar to (Expression 1) above is performed.

Figure 7:
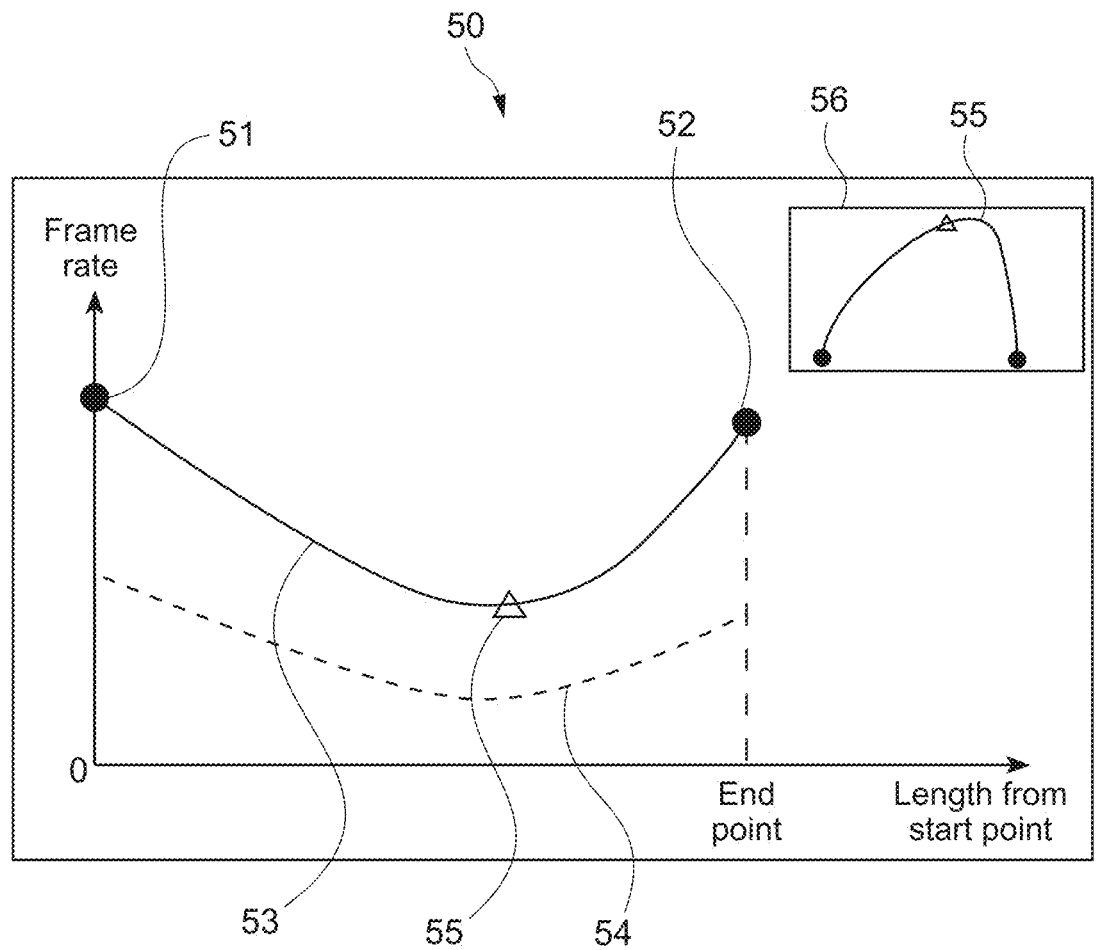
FIG. 7 A schematic diagram showing an example of a control GUI 50 for controlling the frame rate.

FIG. 7 is a schematic diagram showing an example of a control GUI 50 for controlling the frame rate.

As shown in FIG. 7, a graph indicating a frame rate as the vertical axis and a length from the start point as the horizontal axis is displayed in the control GUI 50. In the present embodiment, the user can adjust the frame rate in the frame rate region via the control GUI 50.

A solid line 53 connecting an end point 52 from a start point 51 indicates a frame rate of the expected path 43 to the end point 45 from the start point 44 input via the control GUI 40 shown in FIG. 5.

A dotted line 54 connecting the end point 52 from the start point 51 indicates an area in the image for which the frame rate can be changed. That is, the user can adjust the frame rate so as to exceed the dotted line displayed in the control GUI 50.

The frame rate indicated by the dotted line 54 is calculated on the basis of an actual speed of the particular subject recognized by the recognition unit 17. The frame rate may be calculated on the basis of an actual speed of the particular subject during shooting, for example. Moreover, the frame rate may be calculated on the basis of the speed of the particular subject in the rehearsal image, for example.

The frame rate indicated by the dotted line 54 can be determined by (Expression 1) above. In this case, a speed of the particular subject in the rehearsal image, which is detected in advance by the recognition unit 17, is used as a predictive value of Vnow that is the actual speed of the particular subject. Accordingly, the dotted line 54 corresponding to the determined frame rate is displayed in the control GUI 50.

Moreover, in a case where there is a rehearsal image and the solid line 53 exceeds the dotted line 54, the control GUI 50 presents it to the user. For example, a text may be presented to the user or it may be presented as a sound.

Moreover, a marker 55 indicating a position of the particular subject on the expected path is displayed in the control GUI 50. That is, the user can adjust the frame rate of the particular subject at the current position of the marker 55.

As shown in FIG. 7, the control GUI 50 has an image display unit 56 that displays a frame rate region and a particular subject.

The image display unit 56 displays the expected path 43 set by the control GUI 40 and the position (marker 55) of the particular subject that passes along the expected path. Accordingly, the user can control the frame rate of the particular subject at each position of the expected path while seeing the marker 55 on the expected path and the graph at the same time. Moreover, the image display unit 56 may display the rehearsal image.

Referring back to FIG. 3, the determination unit 24 determines whether or not the distance between the particular subject and the frame rate region is equal to or smaller than the threshold (Step 104).

In a case where the distance between the particular subject and the frame rate region is not equal to or smaller than the threshold (NO in Step 104), the frame rate of the image is not controlled until the distance between the particular subject and the frame rate region becomes equal to or smaller than the threshold.

In a case where the distance between the particular subject and the frame rate region becomes equal to or smaller than the threshold (YES in Step 104), control is made to shoot or reproduce the image at the frame rate set by the shooting control unit 25 and the reproduction control unit 26 (Step 105). In the present embodiment, the recognition unit 17 recognizes the position of the particular subject and the frame rate at the position.

For example, the control unit 15 controls the imaging element 13 so that all images are shot at high frames per second. At this time, the frame rate of the image is controlled in such a manner that the shooting control unit 25 or the reproduction control unit 26 performs processing of decimating frames by conversion processing or the like. Alternatively, when all images are shot at low frames per second, the frame rate of the image may be controlled in such a manner that the shooting control unit 25 or the reproduction control unit 26 adds frames by addition processing or the like. Alternatively, the frame rate of the image may be controlled by performing processing of combining images or the like.

Specifically, in a case where the frame rate of the image is controlled in real time during shooting, a time interval for shooting an image for each frame is successively changed by the shooting control unit 25. That is, images shot at different time intervals are reproduced at equal time intervals during reproduction, and therefore the user can see the images changing in the reproduction speed.

Moreover, for example, the control unit 15 is capable of making control to perform shooting at the frame rate set to the imaging element 13.

Moreover, also during reproduction, the reproduction control unit 26 reproduces the image at the frame rate during reproduction, which has been set by the frame rate setting unit 23, by performing decimation or addition processing.

[Shape of Frame Rate Region]

Figure 8:
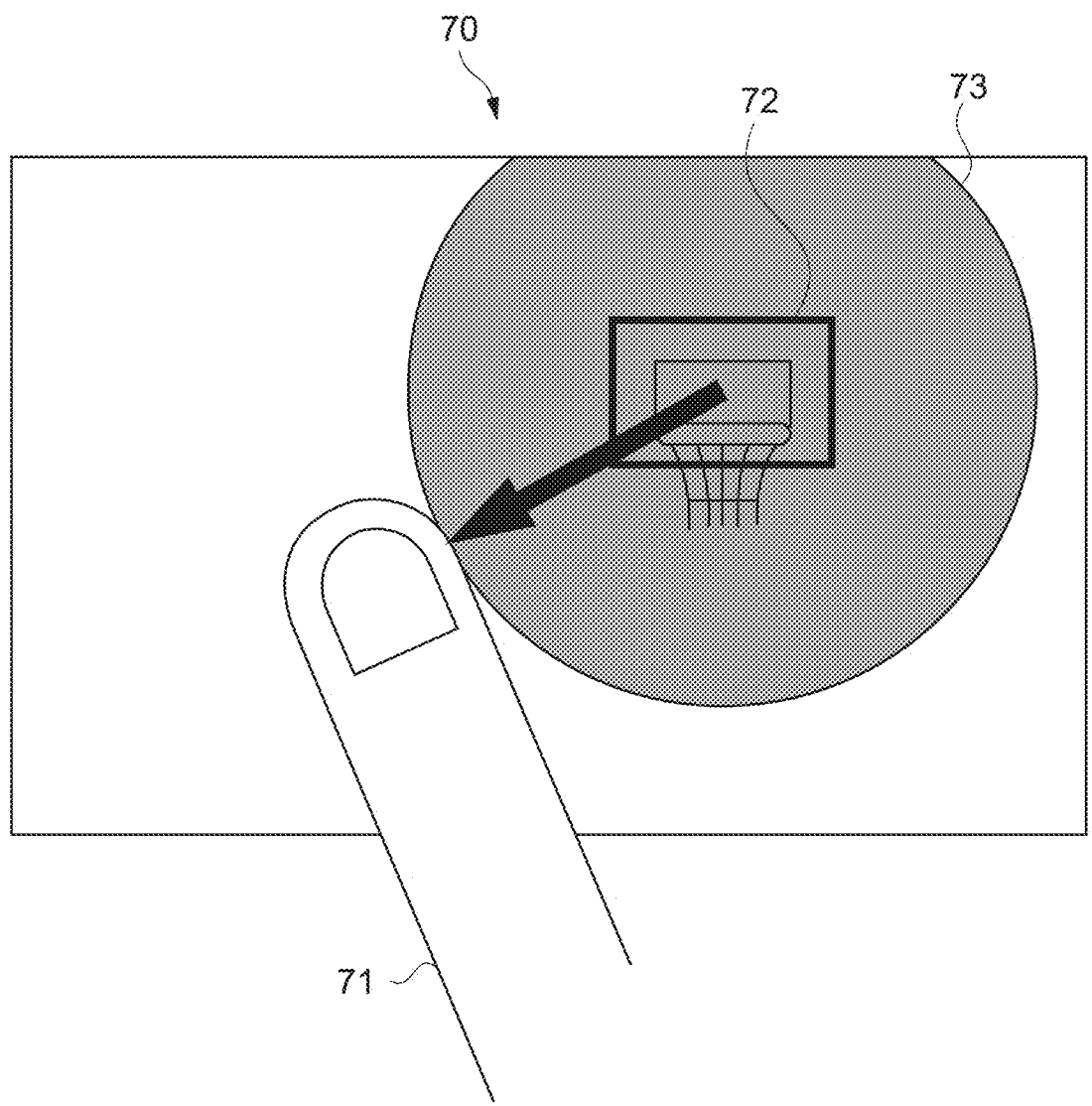
FIG. 8 A schematic diagram showing an example of the shape of the frame rate region.

FIG. 8 is a schematic diagram showing an example of the shape of the frame rate region.

As shown in FIG. 8, the user sets a circular frame rate region via a control GUI 70. In the present embodiment, the user can set a frame rate region by touching an arbitrary point and sliding a finger 71 (operation of moving the finger in touch). By, for example, touching a goal 72 and sliding the finger in a predetermined direction, a circular frame rate region 73 having a distance by which the user has moved the finger as a radius is set.

Figure 9:
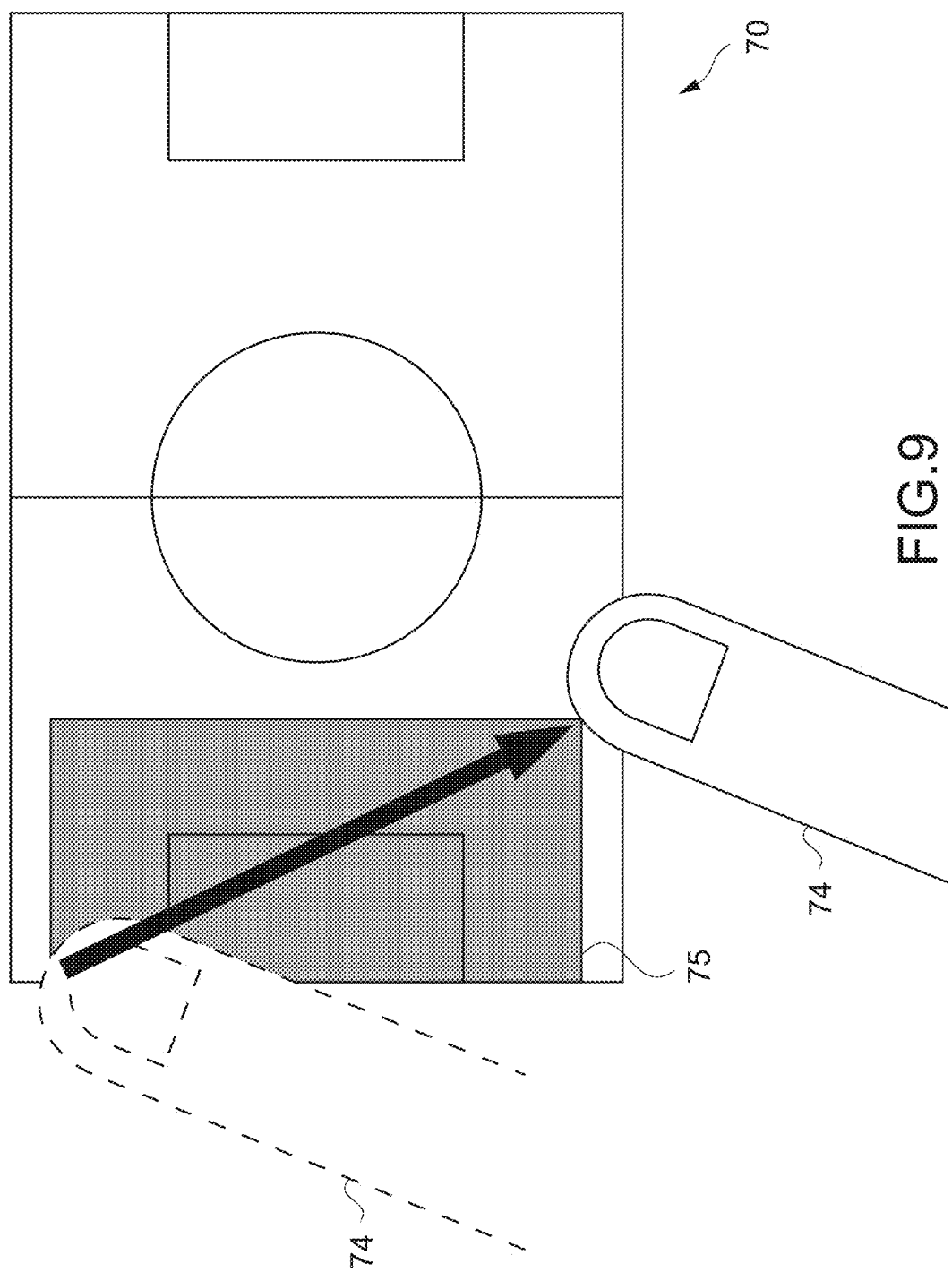
FIG. 9 A schematic diagram showing another example of the shape of the frame rate region.

FIG. 9 is a schematic diagram showing another example of the shape of the frame rate region. In FIG. 9, the imaging apparatus 10 is shooting an image of an entire stadium at a wide angle.

As shown in FIG. 9, the user sets a rectangular frame rate region via the control GUI 70. In the present embodiment, the user can set a frame rate region by touching a predetermined position and sliding a finger 74. By, for example, the user touching a predetermined point in FIG. 9 and sliding the finger in a predetermined direction, a rectangular frame rate region 75 whose diagonal line corresponds to a distance by which the user has moved the finger is set.

Moreover, the user can set a center coordinate of the set frame rate region 75. In a case where the user does not set them, the center coordinate of the frame rate region 75 is set at the center of weight of the frame rate region. Moreover, as for the circular frame rate region 73, a center coordinate (an arbitrary point touched) is set as the center.

It should be noted that a method of setting the frame rate region is not limited. For example, as for the circular frame rate region, the coordinate and the radius may be input as numerical values. Moreover, the frame rate region can be set by the user tracing the shape (boundary) of the frame rate region with the finger, for example.

[Control Example of Frame Rate]

Figure 10:
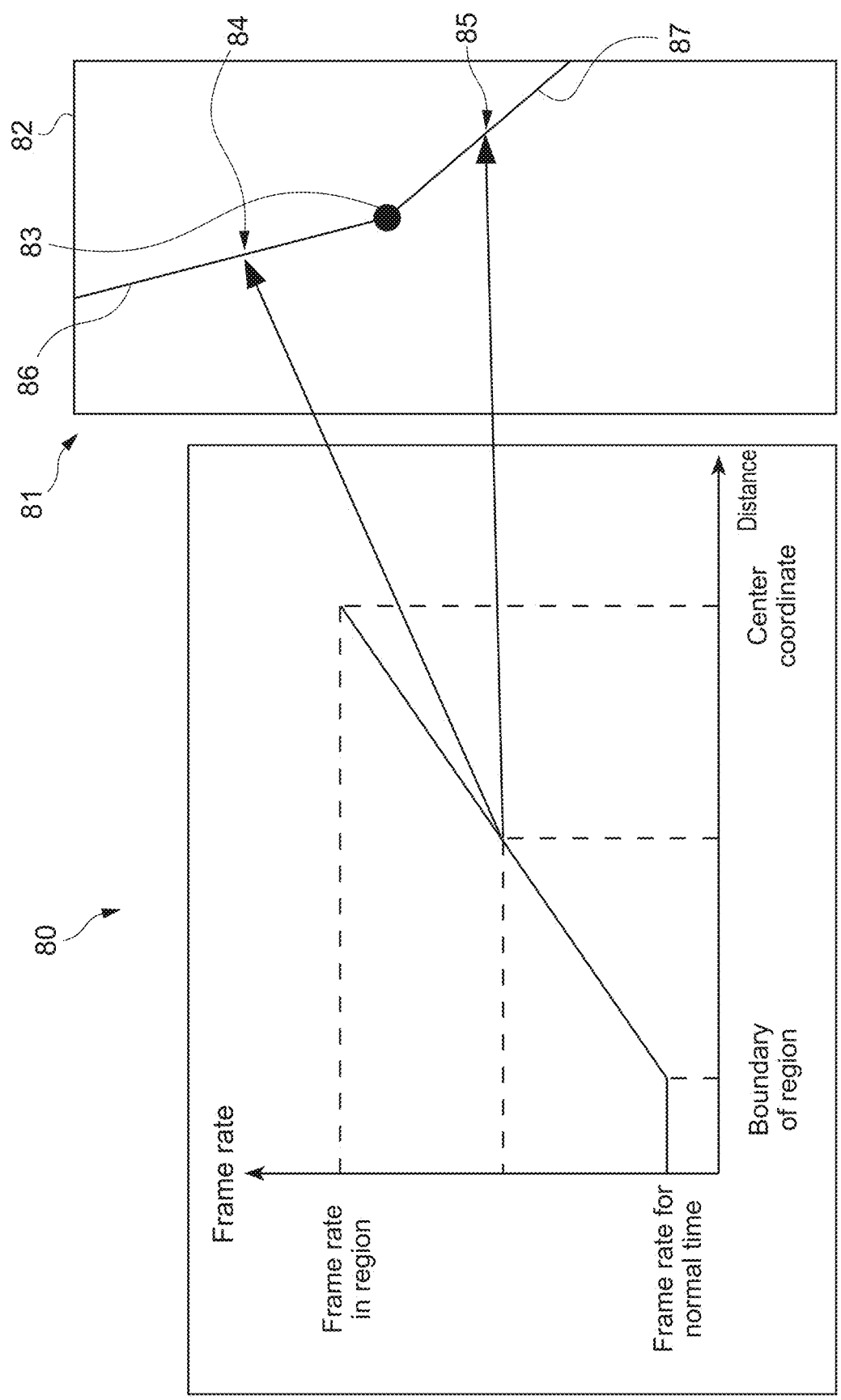
FIG. 10 A schematic diagram showing an example of a control GUI of the frame rate in the frame rate region.

FIG. 10 is a schematic diagram showing an example of a control GUI of the frame rate in the frame rate region. In FIG. 10, a graph indicating control of the frame rate in the frame rate region and an expected path 81 corresponding to the graph are displayed in a control GUI 80.

In the present embodiment, the control unit 15 controls the frame rate of the image on the basis of a position of the particular subject and a position of a center coordinate 83 set within a frame rate region 82, which have been determined by the determination unit 24. Moreover, the user can control the frame rate corresponding to a path from the boundary of the frame rate region 82 to the center coordinate 83 of the frame rate region via the control GUI 80.

As shown in FIG. 10, a graph indicating a frame rate as the vertical axis and a distance from the start point as the horizontal axis is displayed in the control GUI 80. Moreover, in the present embodiment, the frame rate of the image is controlled so that the frame rate increases as the particular subject approaches the center coordinate from the boundary of the frame rate region.

Here, the frame rate for the normal time is a normal frame rate when the image is reproduced. For example, in a case where the image is reproduced at frames per second of 60, the frames per second of 60 is the frame rate for the normal time.

For example, the user sets, via the control GUI 80, a value of the frame rate near the boundary of the frame rate region 82, a ratio of a distance between the boundary and the center coordinate 83 to an increase (decrease) in frame rate, and a value of the frame rate at the center coordinate 83.

Moreover, in the present embodiment, since frame rates at positions 84 (85) where a distance ratio of the center coordinate 83 to the frame rate region 82 is the same are set to be the same, a single graph is displayed for the frame rate region 82. Thus, in a case where the frame rate is set to be different between the path 81 to the center coordinate 83 from the boundary of the frame rate region 82 and a path 87 to the boundary of the frame rate region 82 from the center coordinate 83, two graphs are displayed.

It should be noted that a method of controlling the frame rate is not limited. For example, methods as in FIGS. 11, 12, 13, and 14 to be described later may be employed.

FIGS. 11 to 14 are schematic diagrams showing an example of the control of the frame rate.

The graphs shown in FIGS. 11 to 14 are graphs indicating a frame rate as the vertical axis and a distance from the start point as the horizontal axis.

Figure 11:
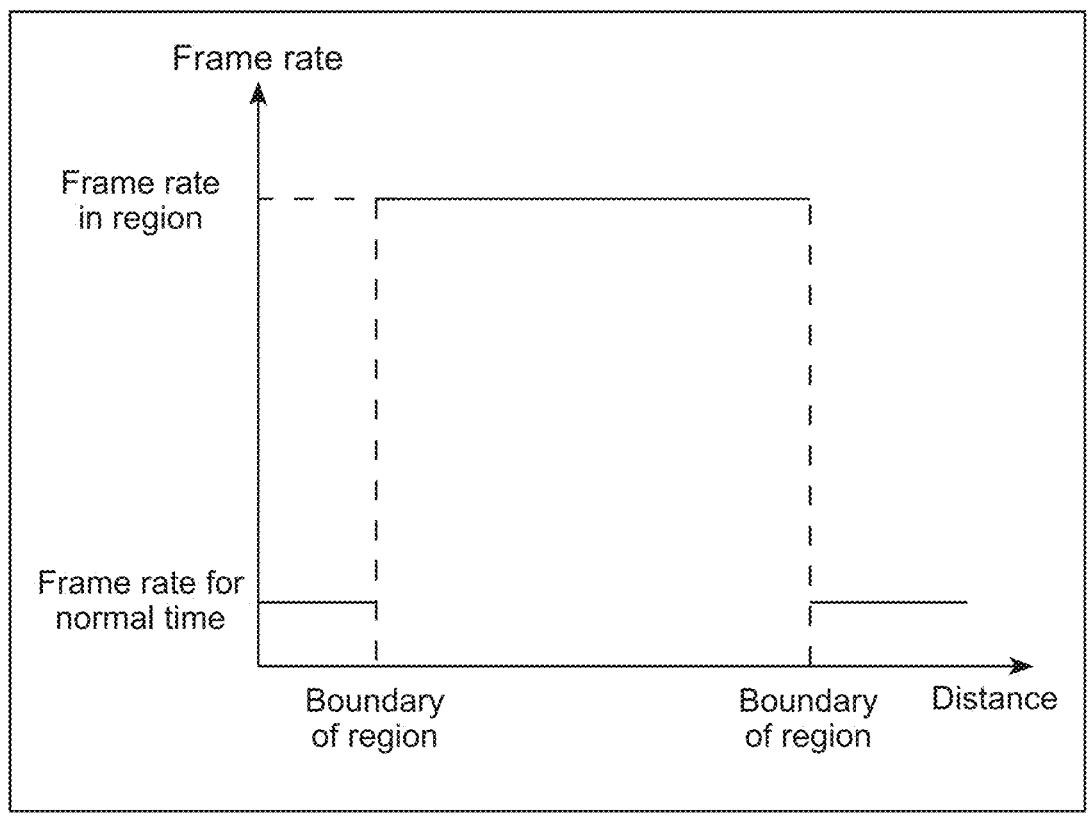
FIG. 11 A schematic diagram showing an example of the control of the frame rate.

In the control example shown in FIG. 11, in a case where the particular subject goes beyond the boundary of the frame rate region, the frame rate of the image is controlled to be the set frame rate in the frame rate region.

In the present embodiment, the determination unit 24 determines whether or not the particular subject goes beyond the boundary of the frame rate region. For example, the determination unit 24 determines whether or not the center of weight of the particular subject goes beyond the frame rate region. In a case where the center of weight of the particular subject has gone beyond the frame rate region, the control unit 15 changes the frame rate of the image into the frame rate shown in FIG. 11.

Figure 12:
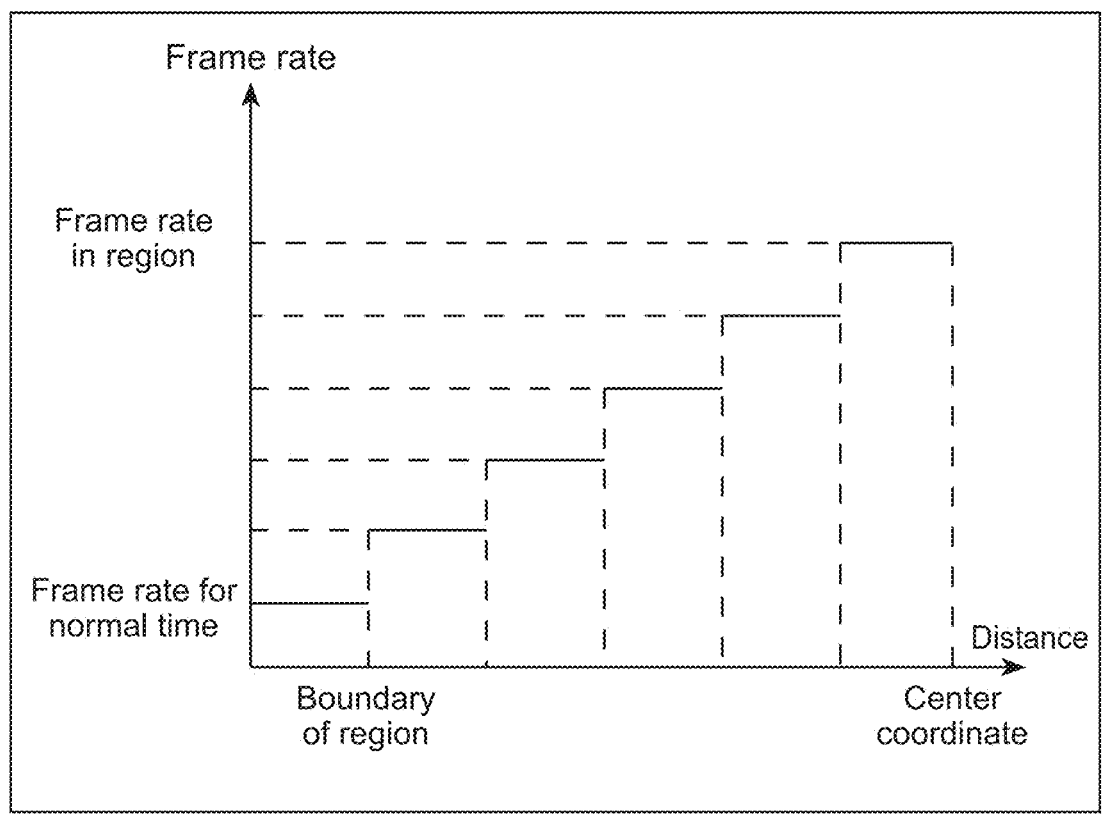
FIG. 12 A schematic diagram showing an example of the control of the frame rate.

In the control example shown in FIG. 12, in a case where the particular subject has gone beyond the boundary of the frame rate region, the frame rate of the image is set to be stepwisely changed as the particular subject approaches the center coordinate of the frame rate region. For example, the frame rate is set to increase stepwisely as the particular subject approaches the center coordinate. Moreover, for example, the frame rate of the image may be set to decrease stepwisely as the particular subject moves further from the center coordinate.

For example, the user may be able to control by how much steps the frame rate should approach a set value via the control GUI or the control unit 15 may calculate it as appropriate. Moreover, for example, the relationship between the distance and the frame rate as shown in FIG. 12 is recorded in the recording unit 16 as a table in advance and the control unit 15 may control the frame rate of the image on the basis of the table.

Figure 13:
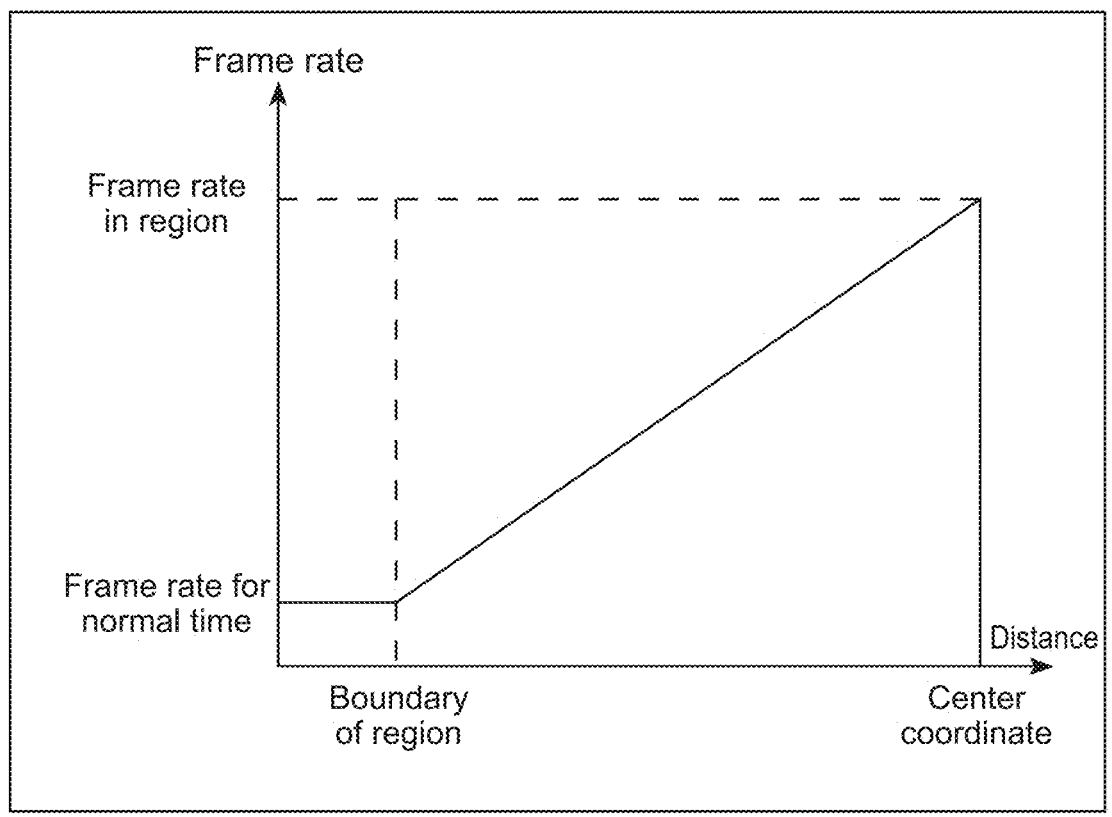
FIG. 13 A schematic diagram showing an example of the control of the frame rate.
Figure 14:
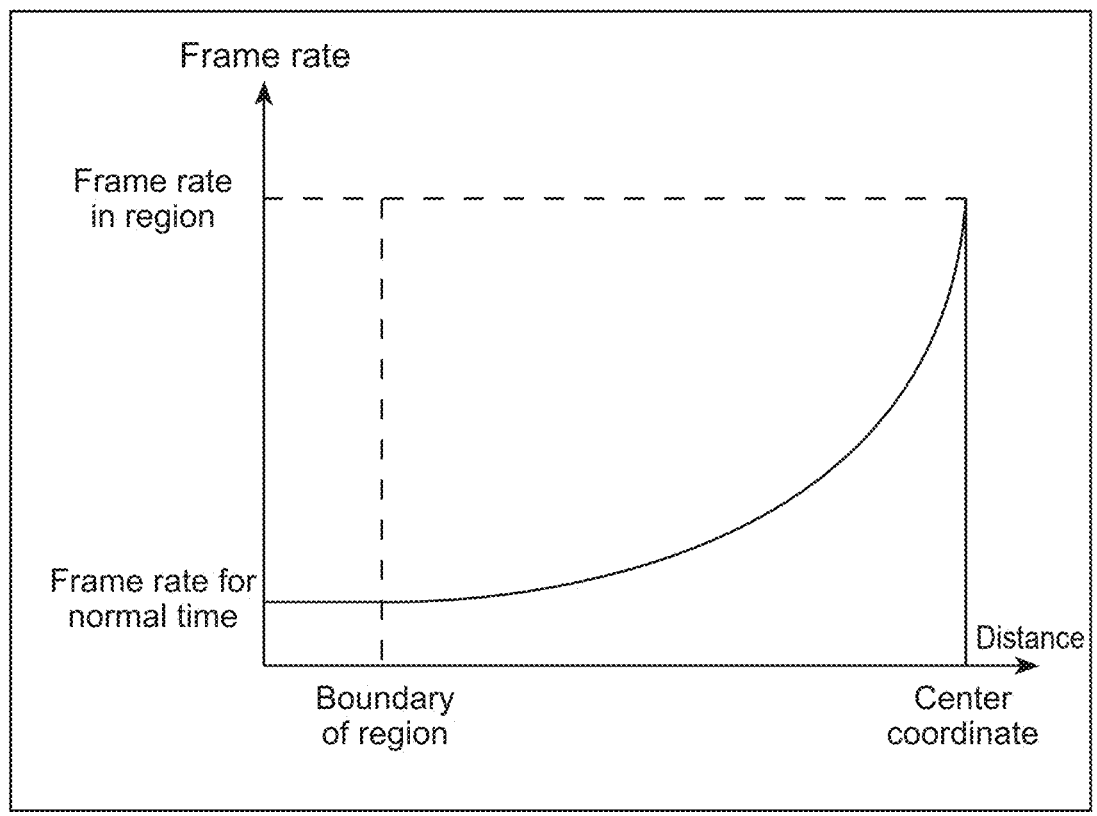
FIG. 14 A schematic diagram showing an example of the control of the frame rate.

In the control example shown in FIGS. 13 and 14, in a case where the particular subject has gone beyond the boundary of the frame rate region, the frame rate of the image is set to be continuously changed as the particular subject approaches the center coordinate of the frame rate region. For example, the frame rate is set so that the gradient of the straight line becomes steeper as the particular subject approaches the center coordinate. Moreover, for example, the frame rate is set so that the gradient of the straight line becomes gentler as the particular subject moves further from the center coordinate. Moreover, for example, the user can make control via the control GUI so that the gradients of the straight line and the curve line in approaching the set value of the frame rate become higher or lower. That is, the coefficient of the straight line or the curve line is changed.

Moreover, the relationship between the distance and the frame rate as shown in FIG. 13 may be recorded in the recording unit 16 as a table in advance and the control unit 15 may control the frame rate of the image on the basis of the table.

Hereinabove, in the imaging apparatus 10 according to the present embodiment, the particular subject in the image is recognized. Whether or not the distance between the recognized particular subject and the frame rate region for setting the frame rate of the image is equal to or smaller than the threshold is determined. Accordingly, the frame rate of the image can be easily controlled.

In general, a method such as a RAMP effect of gradually changing the frame rate of the moving image is sometimes used for a scene wished to be made impressive as a video expression. It is necessary to perform shooting by dynamically changing the frame rate at the time of imaging in order to obtain a smooth presentation effect. For such shooting, a scene to be shot is decided previously, rehearsal or the like is performed, and a target frame rate and a time to reach the frame rate are set. In this case, the timing has to be correctly adjusted to an object motion, and it is difficult to shoot a moving image as it is expected.

In view of this, in the present technology, the user can input a frame rate of a particular subject by tracing an expected path. Accordingly, it becomes easier to shoot, reproduce, and edit an image by more intuitive input than in the prior art.

<Other Embodiments>

The present technology is not limited to the above-mentioned embodiments, and various other embodiments can be realized.

In the above-mentioned embodiments, the imaging apparatus 10 controls the frame rate of the image during shooting and reproduction. The present technology is not limited thereto. The shot image may be sent to the external information processing apparatus and the frame rate of the image may be controlled by the information processing apparatus.

Figure 15:
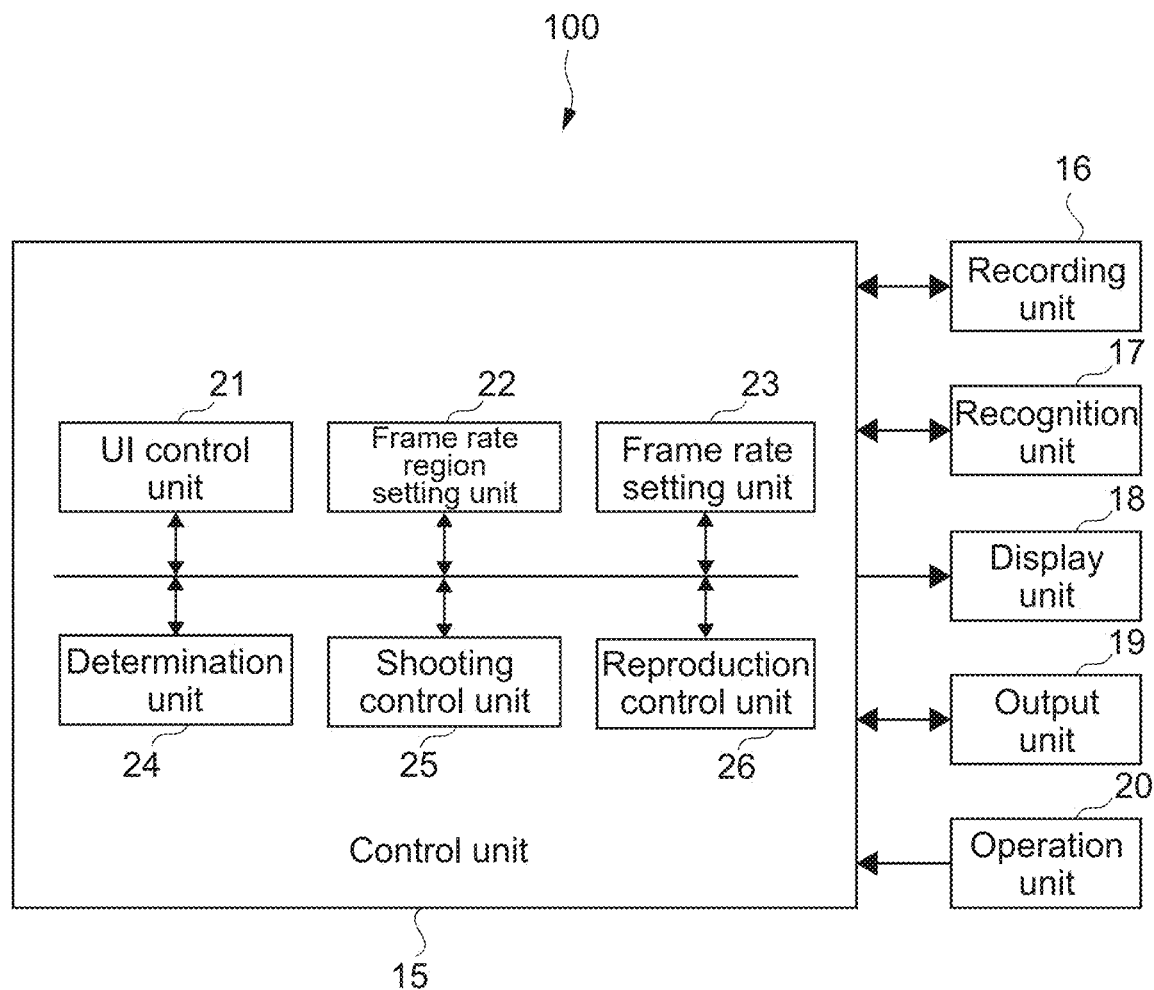
FIG. 15 A block diagram showing a functional configuration example of an information processing apparatus.

FIG. 15 is a block diagram showing a functional configuration example of the information processing apparatus.

As shown in FIG. 15, an information processing apparatus 100 has a control unit 15, a recording unit 16, a recognition unit 17, a display unit 18, an output unit 19, and an operation unit 20.

The information processing apparatus 100 includes an editor apparatus such as a PC and a smartphone and a reproduction apparatus such as a monitor. For example, in a case of the editor apparatus or the reproduction apparatus, the imaging apparatus 10 may supply image signals and the frame rate may be controlled with respect to the image signals. Moreover, for example, the reproduction apparatus may be supplied with a signal indicating that control is made to have the frame rate set by the editor apparatus and the reproduction apparatus may control the frame rate in accordance with the signal.

It should be noted that since the respective blocks perform processing similar to that of the blocks mounted on the imaging apparatus 10, the descriptions will be omitted.

For example, the information processing apparatus 100 is connected to be capable of communicating with the imaging apparatus 10 that shoots an image via the output unit 19 with a wire or wirelessly. The connection form between the respective devices is not limited, and for example, wireless LAN communication such as Wi-Fi or near-field communication such as Bluetooth (registered trademark) can be used.

For example, shooting image signals or reproduction image signals may be received from the imaging apparatus 10 and the frame rate of the image signals received by the information processing apparatus 100 may be controlled. Moreover, for example, reproduction image signals recorded in a recording device such as a secure digital (SD) card may be read.

Moreover, for example, it is possible to control the frame rate of the shooting image signals or the reproduction image signals. In this case, the image at the set frame rate is reproduced by the control unit 15 performing decimation or addition processing of the frame rate on the recorded image.

Moreover, for example, a shooting image or reproduction image whose frame rate has been controlled by the imaging apparatus 10 or the information processing apparatus 100 may be displayed on a display unit of an external apparatus.

In the above-mentioned embodiments, the frame rate is controlled in accordance with the distance between the particular subject and the frame rate region. The present technology is not limited thereto. Interpolation processing may be performed in a case where an actual position of the particular subject during shooting is deviated from a position of the frame rate region. In other words, interpolation processing may be performed in a case where an actual motion (path) of the particular subject during shooting is deviated from a set path (expected path) of the frame rate region.

For example, in a case where the particular subject is deviated from the frame rate region when performing shooting or reproduction at the set frame rate, the control unit 15 may control the frame rate of the image by nearest-neighbor interpolation, quadratic interpolation, or the like.

In the above-mentioned embodiments, the frame rate of the image is controlled on the basis of the speed of the particular subject input by the user's finger. The present technology is not limited thereto, and the user may input a numerical value of the frame rate of the image.

Hereinabove, the image is shot and reproduced in accordance with the set frame rate of the image. The present technology is not limited thereto. In a case where the user cannot actually shoot and reproduce an image at the set frame rate, calculation may be performed as follows.

In the above-mentioned embodiments, the frame rate is input corresponding to the speed of moving the user's finger. The present technology is not limited thereto, and a button or the like that can arbitrarily change the numerical value may be displayed in the control GUI.

In the above-mentioned embodiments, only one frame rate region is set. The present technology is not limited thereto, and a plurality of frame rate regions may be set. For example, two frame rate regions including a basket goal may be set. In this case, when a basketball that is the particular subject approaches each frame rate region, the image may be shot and reproduced at the set frame rate. Moreover, in this case, different frame rates may be set to the frame rate regions including the basket goal.

Moreover, for example, in a case where the plurality of frame rate regions overlap each other, the control unit 15 may control the frame rate of the image on the basis of a frame rate of a frame rate region in which the particular subject is closer to the center coordinate of the frame rate region. Moreover, for example, the control unit 15 may take a weighted arithmetic mean of frame rates on the basis of a distance between center coordinates of the plurality of frame rate regions and the particular subject.

In the above-mentioned embodiments, the frame rate is controlled for sports such as basketball. The present technology is not limited thereto, and may be used for an arbitrary field. For example, a frame rate region may include a wedding cake and the frame rate may be controlled to be a set frame rate when people come close for cutting the cake.

Figure 16:
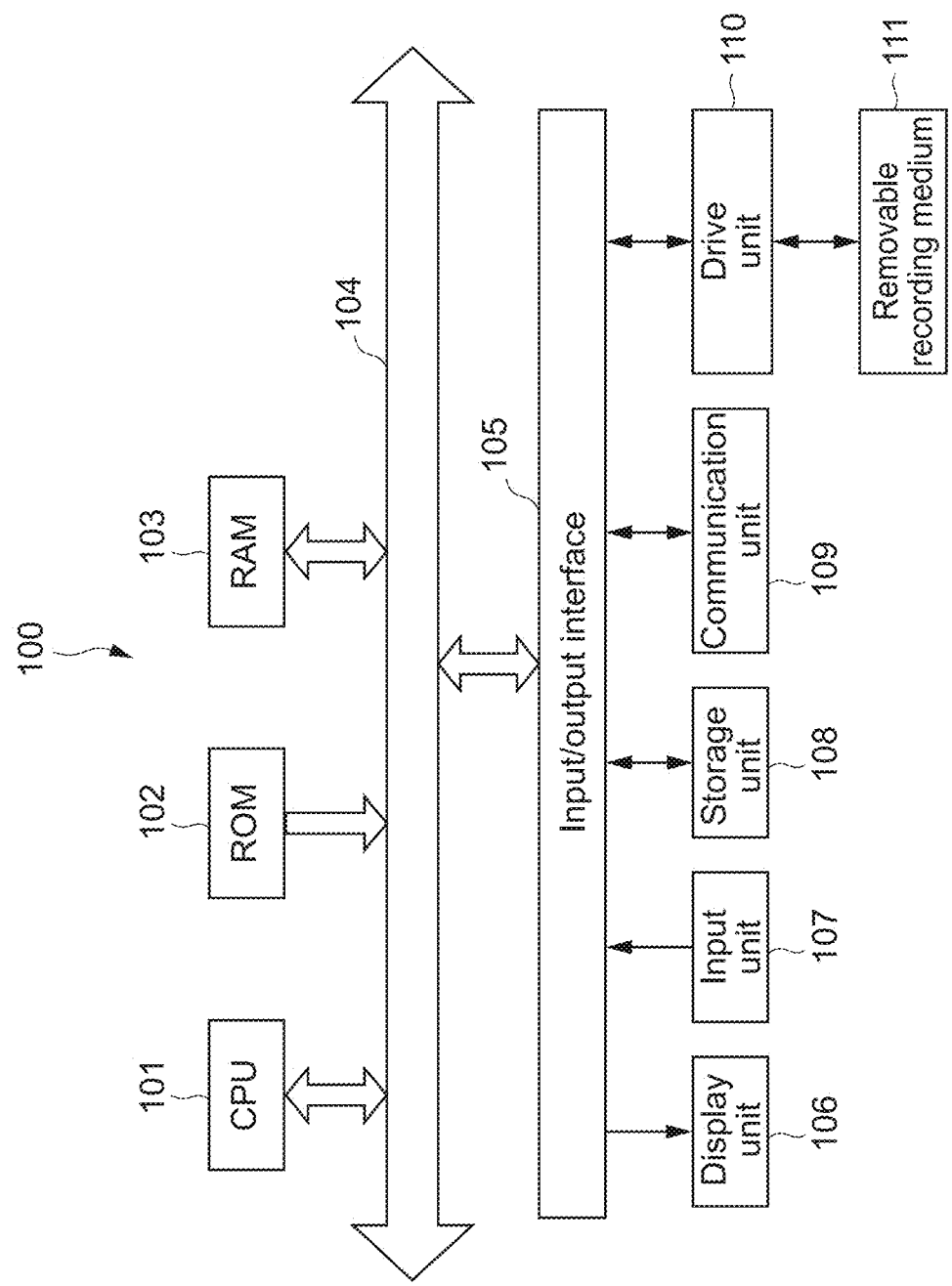
FIG. 16 A block diagram showing a hardware configuration example of the information processing apparatus.

FIG. 16 is a block diagram showing a hardware configuration example of the information processing apparatus 100.

The information processing apparatus 100 includes a CPU 101, a ROM 102, a RAM 103, an input/output interface 105, and a bus 104 that connects them to one another. A display unit 106, an input unit 107, a storage unit 108, a communication unit 109, a drive unit 110, and the like are connected to the input/output interface 105.

The display unit 106 is, for example, a display device using liquid-crystal, EL, or the like. The input unit 107 includes, for example, a keyboard, a pointing device, a touch panel, and other operation devices. In a case where the input unit 107 includes a touch panel, the touch panel can be integral with the display unit 106.

The storage unit 108 is a nonvolatile storage device and includes, for example, an HDD, a flash memory, and other solid-state memories. The drive unit 110 is, for example, a device capable of driving a removable recording medium 111 such as an optical recording medium and a magnetic recording tape.

The communication unit 109 includes a modem, a router, and other communication devices for communicating with other devices, which are connectable to a LAN, a WAN, and the like. The communication unit 109 may perform wired communication or may perform wireless communication. The communication unit 109 is often used separately from the information processing apparatus 100.

Software stored in the storage unit 108, the ROM 102, or the like cooperates with hardware resources of the information processing apparatus 100, thereby realizing information processing of the information processing apparatus 100 having the above-mentioned hardware configuration. Specifically, loading into the RAM 103 programs that configure the software, which are stored in the ROM 102 or the like, and executing the programs realize an information processing method according to the present technology.

The programs are, for example, installed in the information processing apparatus 100 via the recording medium 111. Alternatively, the programs may be installed in the information processing apparatus 100 via a global network or the like. Otherwise, an arbitrary computer-readable non-transitory storage medium may be used.

By cooperation of a computer mounted on a communication terminal with another computer capable of communicating therewith via a network or the like, an imaging apparatus, an information processing apparatus, an information processing method, and a program according to the present technology are performed and the information processing apparatus according to the present technology may be built.

That is, the imaging apparatus, the information processing apparatus, the information processing method, and the program according to the present technology may be performed not only in a computer system configured by a single computer but also in a computer system in which a plurality of computers cooperatively operate. It should be noted that in the present disclosure, the system means a set of a plurality of components (apparatus, module (parts), and the like) and it does not matter whether or not all the components are housed in the same casing. Therefore, both of a plurality of apparatuses housed in separate casings and connected to one another via a network and a single apparatus having a plurality of modules housed in a single casing are the system.

Performing the imaging apparatus, the information processing apparatus, the information processing method, and the program according to the present technology by the computer system includes, for example, both of a case where a single computer performs recognition of the particular subject, setting of the frame rate, control of the frame rate, and the like and a case where different computers perform the respective processes. Moreover, performing the respective processes by a predetermined computer includes causing another computer to perform some or all of those processes and acquiring the results.

That is, the imaging apparatus, the information processing apparatus, the information processing method, and the program according to the present technology can also be applied to a cloud computing configuration in which a plurality of apparatuses shares and cooperatively processes a single function via a network.

The respective configurations such as the frame rate region setting unit 22, the determination unit 24, and the frame rate setting unit 23, the control flow of the communication system, and the like, which have been described with reference to the respective drawings, are merely embodiments, and can be arbitrarily modified without departing from the gist of the present technology. That is, any other configurations, algorithms, and the like for carrying out the present technology may be employed.

It should be noted that the effects described in the present disclosure are merely exemplary and not limitative, and further other effects may be provided. The description of the plurality of effects above does not necessarily mean that those effects are provided at the same time. It means that at least any one of the above-mentioned effects is obtained depending on a condition and the like, and effects not described in the present disclosure can be provided as a matter of course.

At least two features of the features of the above-mentioned embodiments may be combined. That is, the various features described in the respective embodiments may be arbitrarily combined across the respective embodiments.

It should be noted that the present technology can also take the following configurations.

(1) An imaging apparatus, including:
 a recognition unit that recognizes a particular subject in an image; and
 a determination unit that determines whether or not a distance between the recognized particular subject and a frame rate region for setting a frame rate of the image is equal to or smaller than a threshold.

(2) The imaging apparatus according to (1), further including
 a frame rate region setting unit that sets the frame rate region.

(3) The imaging apparatus according to (1) or (2), further including
 a frame rate setting unit that sets the frame rate of the image.

(4) The imaging apparatus according to (2), further including
 a shooting control unit that makes control to shoot the image at the set frame rate in a case where the determination unit determines that the distance between the particular subject and the set frame rate region is equal to or smaller than the threshold.

(5) The imaging apparatus according to (2), further including
 a reproduction control unit that makes control to reproduce the image at the set frame rate in a case where the determination unit determines that the distance between the particular subject and the set frame rate region is equal to or smaller than the threshold.

(6) The imaging apparatus according to (2), in which
 the frame rate region setting unit sets the frame rate region as a point.

(7) The imaging apparatus according to (2), in which
 the frame rate region setting unit sets the frame rate region as a line.

(8) The imaging apparatus according to (2), in which
 the frame rate region setting unit sets the frame rate region as a region with a predetermined area.

(9) The imaging apparatus according to (4), in which
 the frame rate region setting unit sets a plurality of frame rate regions each of which is the frame rate region, and
 the shooting control unit makes control to shoot the image at the set frame rate in a case where the determination unit determines that the distance between the particular subject and each of the plurality of set frame rate regions is equal to or smaller than the threshold.

(10) The imaging apparatus according to (5), in which
 the frame rate region setting unit sets a plurality of frame rate regions, and
 the reproduction control unit makes control to reproduce the image at the set frame rate in a case where the determination unit determines that the distance between the particular subject and each of the plurality of set frame rate regions is equal to or smaller than the threshold.

(11) The imaging apparatus according to (4), in which
 the frame rate region setting unit sets the frame rate region as a region with a predetermined area, and
 the shooting control unit makes control to shoot the image at the set frame rate in a case where the determination unit determines that the particular subject is located within an area of the set frame rate region.

(12) The imaging apparatus according to (5), in which
 the frame rate region setting unit sets the frame rate region as a region with a predetermined area, and
 the reproduction control unit makes control to reproduce the image at the set frame rate in a case where the determination unit determines that the particular subject is located within an area of the set frame rate region.

(13) The imaging apparatus according to (2), further including
 an operation unit that receives an operation of a user, in which
 the frame rate region setting unit sets the frame rate region in accordance with the operation of the user on the operation unit.

(14) The imaging apparatus according to (3), further including
 an operation unit that receives an operation of a user, in which
 the frame rate setting unit sets the frame rate of the image in accordance with the operation of the user on the operation unit.

(15) The imaging apparatus according to (3), in which
 the frame rate setting unit sets the frame rate so that the frame rate changes stepwisely in accordance with a distance between the particular subject and the frame rate region.

(16) The imaging apparatus according to (3), in which
 the frame rate setting unit sets the frame rate so that the frame rate changes continuously in accordance with the distance between the particular subject and the frame rate region.

(17) An information processing apparatus, including:
 a recognition unit that recognizes a particular subject in an image; and
 a determination unit that determines whether or not a distance between the recognized particular subject and a frame rate region for setting a frame rate of the image is equal to or smaller than a threshold.

(18) An information processing method, including:
 by a computer system
 recognizing a particular subject in an image; and
 determining whether or not a distance between the recognized particular subject and a frame rate region for setting a frame rate of the image is equal to or smaller than a threshold.

(19) A program that causes a computer system to execute:
 a step of recognizing a particular subject in an image; and
 a step of determining whether or not a distance between the recognized particular subject and a frame rate region for setting a frame rate of the image is equal to or smaller than a threshold.

REFERENCE SIGNS LIST

10 imaging apparatus
20 operation unit 22 frame rate region setting unit
23 frame rate setting unit
24 determination unit
25 shooting control unit
26 reproduction control unit
40 control GUI
100 information processing apparatus

The invention claimed is:

1. An imaging apparatus, comprising:
a frame rate region setting unit configured to set a frame rate region for setting a frame rate of an image;
a recognition unit configured to recognize a particular subject in the image; and
a determination unit configured to determine whether or not a distance between the recognized particular subject and the set frame rate region is equal to or smaller than a threshold,
wherein the frame rate region setting unit sets the frame rate region according to an operation of a user within a user interface,
wherein the operation of the user includes tracing a line,
wherein, when the distance between the particular subject and the frame rate region is equal to or smaller than the threshold, the frame rate of the image is set based on a position of the particular subject and a position of a coordinate set within the set frame rate region, and
wherein the frame rate region setting unit, the recognition unit, and the determination unit are each implemented via at least one processor.

2. The imaging apparatus according to claim 1, further comprising:
a frame rate setting unit configured to set the frame rate of the image,
wherein the frame rate setting unit is implemented via at least one processor.

3. The imaging apparatus according to claim 2, further comprising:
an operation unit configured to receive the operation of the user,
wherein the operation unit is implemented via at least one processor.

4. The imaging apparatus according to claim 2,
wherein the frame rate setting unit sets the frame rate so that the frame rate changes in a stepwise manner in accordance with a distance between the position of the particular subject and the coordinate set within the frame rate region.

5. The imaging apparatus according to claim 2,
wherein the frame rate setting unit sets the frame rate so that the frame rate changes continuously in accordance with the distance between the particular subject and the frame rate region.

6. The imaging apparatus according to claim 2,
wherein the frame rate setting unit sets the frame rate of the image according to a tracing speed with which the user traces the line.

7. The imaging apparatus according to claim 1, further comprising:
a shooting control unit configured to make control to shoot the image at the set frame rate in a case where the determination unit determines that the distance between the particular subject and the set frame rate region is equal to or smaller than the threshold,
wherein the shooting control unit is implemented via at least one processor.

8. The imaging apparatus according to claim 7, wherein
the frame rate region setting unit sets a plurality of frame rate regions each of which is the frame rate region, and
the shooting control unit makes control to shoot the image at the set frame rate in a case where the determination unit determines that the distance between the particular subject and each of the plurality of set frame rate regions is equal to or smaller than the threshold.

9. The imaging apparatus according to claim 7, wherein
the frame rate region setting unit sets the frame rate region as a region with a predetermined area, and
the shooting control unit makes control to shoot the image at the set frame rate in a case where the determination unit determines that the particular subject is located within an area of the set frame rate region.

10. The imaging apparatus according to claim 1, further comprising:
a reproduction control unit configured to make control to reproduce the image at the set frame rate in a case where the determination unit determines that the distance between the particular subject and the set frame rate region is equal to or smaller than the threshold,
wherein the reproduction control unit is implemented via at least one processor.

11. The imaging apparatus according to claim 10, wherein
the frame rate region setting unit sets a plurality of frame rate regions, and
the reproduction control unit makes control to reproduce the image at the set frame rate in a case where the determination unit determines that the distance between the particular subject and each of the plurality of set frame rate regions is equal to or smaller than the threshold.

12. The imaging apparatus according to claim 10, wherein
the frame rate region setting unit sets the frame rate region as a region with a predetermined area, and
the reproduction control unit makes control to reproduce the image at the set frame rate in a case where the determination unit determines that the particular subject is located within an area of the set frame rate region.

13. The imaging apparatus according to claim 1,
wherein the frame rate region setting unit sets the frame rate region according to a start point and an end point of the line.

14. The imaging apparatus according to claim 1,
wherein the frame rate region setting unit sets the frame rate region as a region with a predetermined area indicated by the traced line.

15. The imaging apparatus according to claim 1, further comprising:
an operation unit configured to receive the operation of the user,
wherein the operation unit is implemented via at least one processor.

16. An information processing apparatus, comprising:
a frame rate region setting unit configured to set a frame rate region for setting a frame rate of an image;
a recognition unit configured to recognize a particular subject in the image; and
a determination unit configured to determine whether or not a distance between the recognized particular subject and the set frame rate region is equal to or smaller than a threshold,
wherein the frame rate region setting unit sets the frame rate region according to an operation of a user within a user interface, wherein the operation of the user includes tracing a line,
wherein, when the distance between the recognized particular subject and the frame rate region is equal to or smaller than the threshold, the frame rate of the image is set based on a position of the recognized particular subject and a position of each coordinate of the line setting the frame rate region, and
wherein the frame rate region setting unit, the recognition unit, and the determination unit are each implemented via at least one processor.

17. An information processing method, executed by a computer system, the method comprising:
setting a frame rate region for setting a frame rate of an image;
recognizing a particular subject in the image; and
determining whether or not a distance between the recognized particular subject and the set frame rate region is equal to or smaller than a threshold,
wherein the frame rate region is set according to an operation of a user within a user interface,
wherein the operation of the user includes tracing a line, and
wherein, when the distance between the recognized particular subject and the frame rate region is equal to or smaller than the threshold, the frame rate of the image is set based on a position of the recognized particular subject and a position of a coordinate set within the set frame rate region.

18. A non-transitory computer-readable storage medium having embodied thereon a program, which when executed by a computer system causes the computer system to execute a method, the method comprising:
setting a frame rate region for setting a frame rate of an image;
recognizing a particular subject in the image; and
determining whether or not a distance between the recognized particular subject and the set frame rate region is equal to or smaller than a threshold,
wherein the frame rate region is set according to an operation of a user within a user interface,
wherein the operation of the user includes tracing a line, and
wherein, when the distance between the recognized particular subject and the frame rate region is equal to or smaller than the threshold, the frame rate of the image is set based on a position of the recognized particular subject and a position of a coordinate set within the set frame rate region.

\* \* \* \* \*